(12) United States Patent
Peterson

(10) Patent No.: US 12,290,986 B2
(45) Date of Patent: May 6, 2025

(54) PRINTED HOLLOW BODIES AND SYSTEMS AND METHODS FOR PRINTING HOLLOW BODIES

(71) Applicant: Science Applications International Corporation, Reston, VA (US)

(72) Inventor: Matthew L. Peterson, Megget, SC (US)

(73) Assignee: Science Applications International Corporation, Reston, VA (US)

( * ) Notice: Subject to any disclaimer, the term of this patent is extended or adjusted under 35 U.S.C. 154(b) by 269 days.

(21) Appl. No.: 17/948,851

(22) Filed: Sep. 20, 2022

(65) Prior Publication Data

US 2023/0014743 A1 Jan. 19, 2023

Related U.S. Application Data

(62) Division of application No. 16/829,875, filed on Mar. 25, 2020, now Pat. No. 11,491,703.

(51) Int. Cl.
| | |
|---|---|
| B29C 64/245 | (2017.01) |
| B29C 64/118 | (2017.01) |
| B29C 64/209 | (2017.01) |
| B29C 64/241 | (2017.01) |
| B29L 31/30 | (2006.01) |
| B32B 1/08 | (2006.01) |
| B33Y 10/00 | (2015.01) |

(Continued)

(52) U.S. Cl.
CPC .......... *B29C 64/245* (2017.08); *B29C 64/118* (2017.08); *B29C 64/209* (2017.08); *B29C 64/241* (2017.08); *B32B 1/08* (2013.01); *B29L 2031/3082* (2013.01); *B29L 2031/3097* (2013.01); *B32B 2260/023* (2013.01); *B32B 2260/046* (2013.01); *B32B 2597/00* (2013.01); *B33Y 10/00* (2014.12); *B33Y 30/00* (2014.12); *B33Y 80/00* (2014.12)

(58) Field of Classification Search
CPC ........................... B29C 64/245; B29C 64/241
See application file for complete search history.

(56) References Cited

U.S. PATENT DOCUMENTS

| | | |
|---|---|---|
| 9,636,869 B2 | 5/2017 | Kroll et al. |
| 10,041,612 B1 | 8/2018 | Korobkov |
| 10,077,854 B1 | 9/2018 | Korobkov |

(Continued)

FOREIGN PATENT DOCUMENTS

WO WO-2019206546 A1 * 10/2019

OTHER PUBLICATIONS

Translation of WO-2019206546-A1 (Year: 2019).*

(Continued)

*Primary Examiner* — John J DeRusso
(74) *Attorney, Agent, or Firm* — Banner & Witcoff, Ltd.

(57) ABSTRACT

Systems and methods for 3D printing hollow bodies, such as bodies having an exterior cylindrical shape with a hollow interior, are described. Such systems and methods utilize rotatable hollow print base supports having an interior size and/or shape that matches the desired exterior shape of the final printed structure. The printed bodies, methods, and systems enable printing of the desired hollow printed body from the outside-to-inside. They also allow easy production, customization, and modification of internal structures within the printed hollow body.

27 Claims, 10 Drawing Sheets

(51) Int. Cl.
    *B33Y 30/00*     (2015.01)
    *B33Y 80/00*     (2015.01)

(56) References Cited

U.S. PATENT DOCUMENTS

| | | | |
|---|---|---|---|
| 10,428,977 | B2 | 10/2019 | Korobkov |
| 10,495,239 | B2 | 12/2019 | Korobkov |
| 2012/0165969 | A1 | 6/2012 | Elsey |
| 2016/0003380 | A1 | 1/2016 | Ott et al. |
| 2016/0138736 | A1 | 5/2016 | Fleischer et al. |
| 2016/0263832 | A1 | 9/2016 | Bui et al. |
| 2020/0156290 | A1* | 5/2020 | Corsmeier ........... B23K 26/082 |
| 2020/0180224 | A1* | 6/2020 | Budge .................... B33Y 10/00 |
| 2020/0307084 | A1* | 10/2020 | Kajita ................... B29C 64/268 |
| 2020/0376743 | A1* | 12/2020 | Jodet ...................... B29C 70/38 |

OTHER PUBLICATIONS

May 12-13, 2015, Munigala, et al., Development and Design of a Cylindrical 3D Printer, 10th International DAAAM Baltic Conference, Industrial Engineering, Tallinn, Estonia.

* cited by examiner

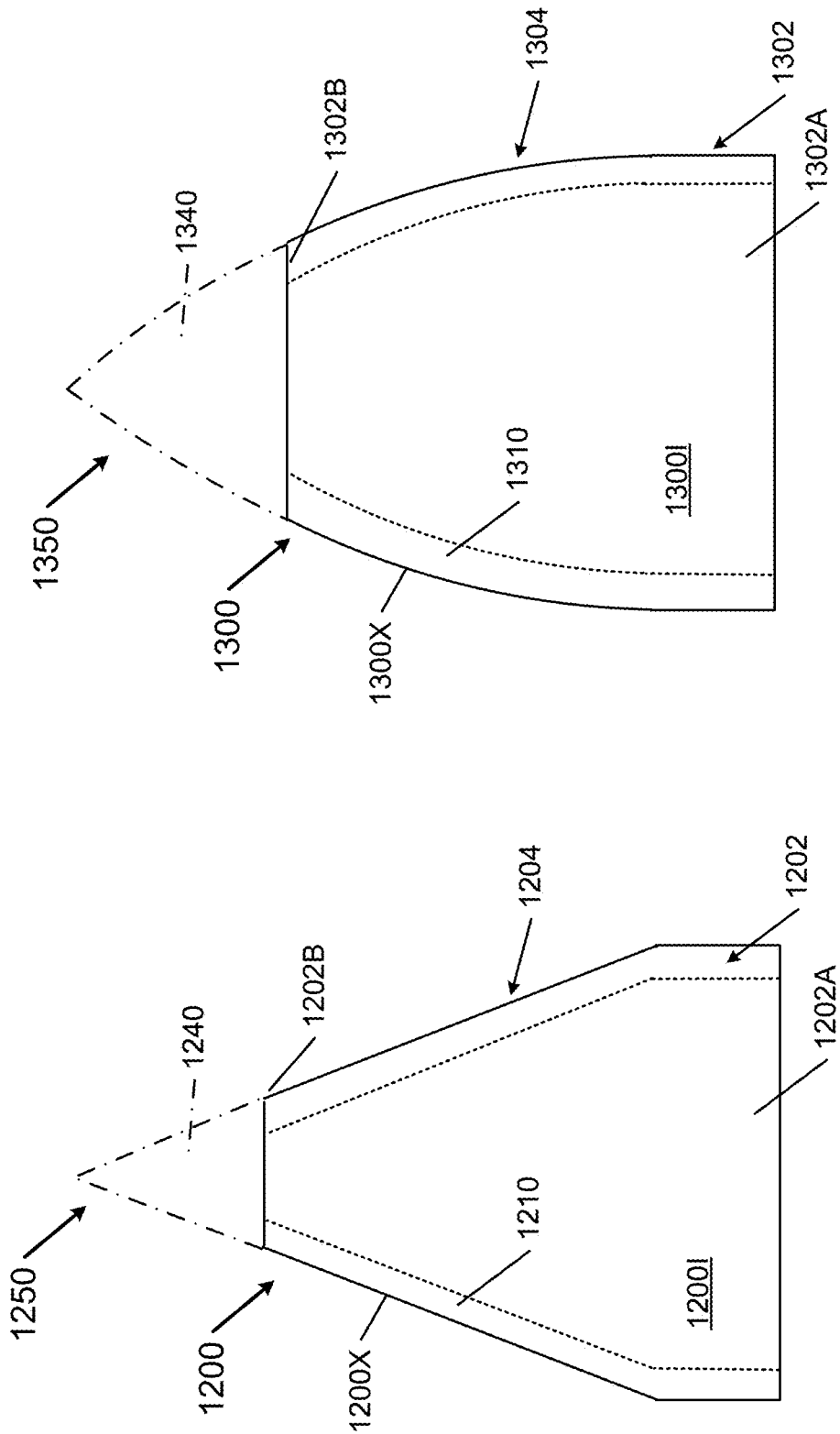

PRINTED HOLLOW BODIES AND SYSTEMS AND METHODS FOR PRINTING HOLLOW BODIES

RELATED APPLICATION DATA

This application is a divisional application based on co-pending U.S. patent application Ser. No. 16/829,875 filed Mar. 25, 2020 and entitled "Printed Hollow Bodies and Systems and Methods for Printing Hollow Bodies." U.S. patent application Ser. No. 16/829,875 is entirely incorporated herein by reference.

BACKGROUND

Structural cylindrical parts, and particularly thin walled cylindrical parts, have many applications in demanding environments. As some examples, cylindrical structures with hollow interiors are useful for rocket bodies, fuselages (e.g., for aircraft, for underwater vehicles, for submersibles, etc.), missile bodies, and torpedo bodies. Such cylindrical bodies are expensive and time consuming to produce. Some methods of manufacture include lathing, milling, or otherwise machining out material from the inside of large and thick billets of material to create a cylinder having the desired wall thickness. Such methods, however, are expensive, time consuming, and generate substantial waste, particularly for large structures having thin walls.

Another method involves riveting or otherwise joining separate parts together to form cylindrical parts. This method is labor intensive, expensive, and time consuming. Further, the presence of such joints risks leaks and/or failure, particularly in environments in which water-tightness and/or gas-tightness are necessary or desired properties of the cylindrical part.

SUMMARY

This Summary introduces a selection of concepts relating to this technology in a simplified form as a prelude to the Detailed Description. This Summary is not intended to identify key or essential features.

Aspects of this technology relate to printed hollow bodies, such as bodies having an exterior cylindrical shape with a hollow interior, that are printed from outside-to-inside. Such printed structures may include: (a) a first printed layer forming an exterior surface of the printed structure and a first interior surface opposite the exterior surface, wherein the first printed layer includes a first plurality of extruded lines of print material that together form a first enclosed hollow portion that extends continuously for 360 degrees around a rotational axis and thereby define the first interior surface; (b) a second printed layer printed onto and at least partially covering the first interior surface, wherein the second printed layer includes a second plurality of extruded lines of print material that together form a second enclosed hollow portion at least partially located in the first enclosed hollow portion, wherein the second enclosed hollow portion extends continuously for 360 degrees around the rotational axis to completely cover at least a portion of the first interior surface within the first enclosed hollow portion, and wherein the second printed layer forms a second interior surface; and, optionally (c) a third printed layer printed onto and at least partially covering the second interior surface, wherein the third printed layer includes a third plurality of extruded lines of print material that together form a third enclosed hollow portion at least partially located in the second enclosed hollow portion, wherein the third enclosed hollow portion extends continuously for 360 degrees around the rotational axis to completely cover at least a portion of the second interior surface within the second enclosed hollow portion, and wherein the third printed layer forms a third interior surface. One or more additional printed layers may be built up inside the third interior surface of the third printed layer.

The interior of the hollow printed structure may include additional printed structures, e.g., that function as supports for other components, such as sensors, other electronics, payload, etc. Such hollow printed structures may be formed, for example, as rocket bodies, fuselage bodies (e.g., for aircraft, for underwater vehicles or other submersibles), missile bodies, torpedo bodies, etc.

Additional aspects of this technology include methods of printing within the interior of a rotatable print support base, such as a hollow mandrel of cylindrical shape (at least on its interior). The layers of the printed bodies deposited within the hollow print support base may be laid down as extruded lines of print media material deposited over the cylindrical structure of an interior surface exposed and located within the print support base interior in a manner substantially parallel to that cylindrical surface. This may be accomplished, for example, by: (a) selectively moving a print head with respect to a surface of the rotatable print support base in a direction substantially parallel to an axial direction of the rotatable print support base (e.g., the "x" direction referred to herein), (b) selectively moving the print head with respect to a surface of the rotatable print support base in a direction of away from a previous layer of print media material deposited (e.g., the "z" direction (or radial direction or thickness direction) referred to herein), and (c) selectively rotating the rotatable print support base with respect to the print head about its rotation axis (e.g., the "Θ" direction referred to herein) while selectively dispensing print media material during relative motion of the print head with respect to the print support base in a manner to deposit the lines of extruded print media material in desired direction(s) and orientation(s) to create the printed layers.

Additional aspects of this technology relate to methods of printing a hollow body from the outside-to-inside, e.g., using the method features described above.

Still additional aspects of this technology relate to printing systems for printing hollow bodies, e.g., for use in the various methods described above. Such printing systems may include: (a) a print head including a print nozzle oriented to dispense print media material; (b) a support system (e.g., roller, gears, chains, sprockets, intermeshing toothed structures, belts, etc., movable by a servo drive and motor under computer control) for rotatably supporting a hollow body about a rotational axis; (c) a print head support system (e.g., a guide rail, guide rail supports, etc.) for supporting the print head such that the print nozzle is positionable adjacent an interior surface located within the hollow body and at a position to dispense print media material onto the interior surface; and (d) a print head moving system for moving the print head in a first direction parallel to the rotational axis and in a second direction perpendicular to the first direction (e.g., moving the print head along the guide rail and moving the guide rail with respect to the rotational axis of the hollow body). Such moving systems may include a servo drive and motor operating under computer control. A hollow mandrel (e.g., a cylindrical body, at least cylindrical on its interior surface) may be included and rotated by the rotational support system to move the print head with respect to the surface on which it is depositing the print media material.

These and other features of this technology are described in more detail below.

BRIEF DESCRIPTION OF THE DRAWINGS

Some features of this technology are shown by way of example, and not by way of limitation, in the figures of the accompanying drawings and in which like reference numerals refer to similar elements throughout the views in which that reference numeral is shown.

FIGS. 11, 12, and 13 illustrate examples of various different hollow structures that may be printed using systems and methods in accordance with at least some examples of this technology.

DETAILED DESCRIPTION

Figure 1:
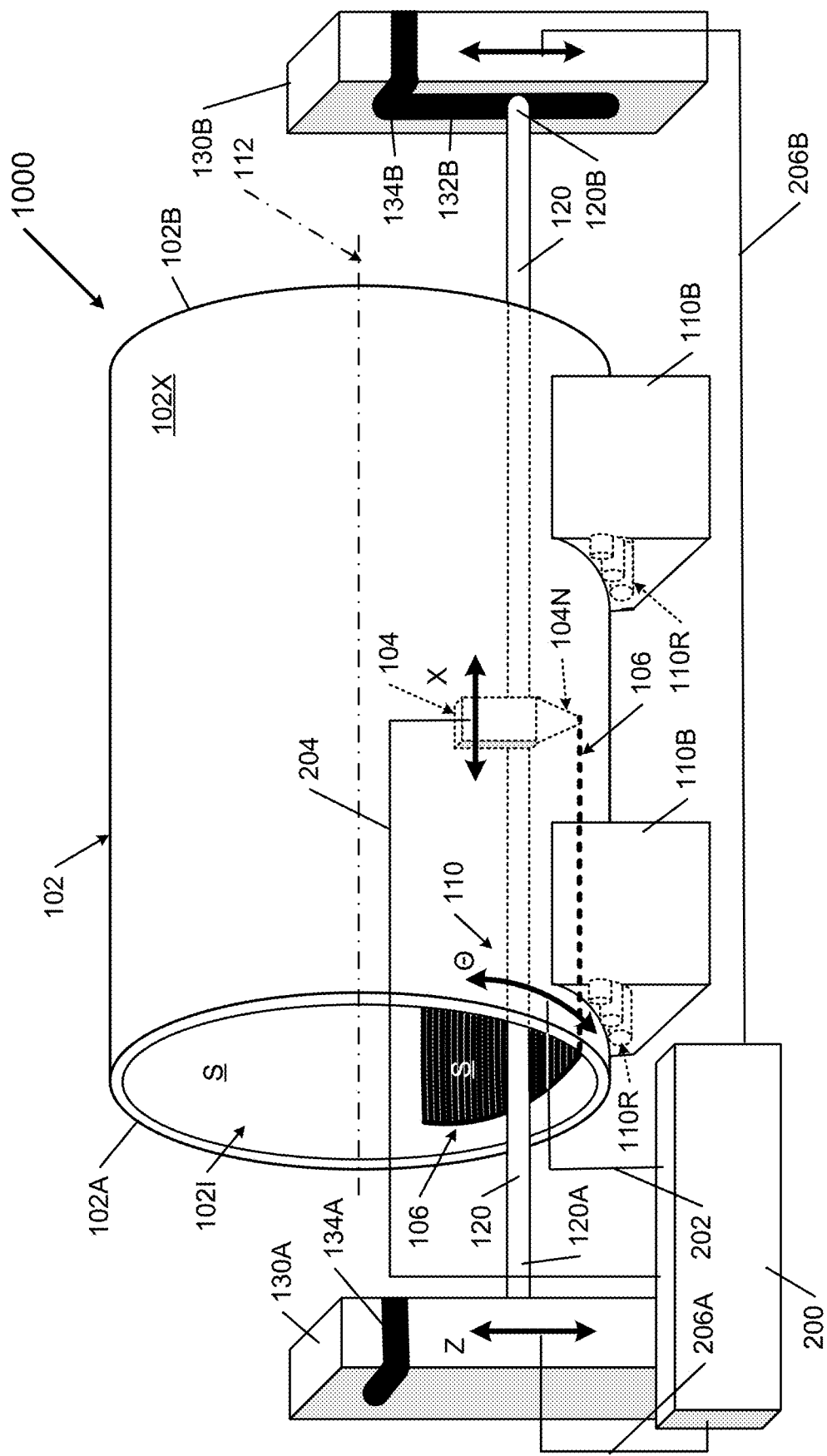
FIG. 1 illustrates an example of systems and methods for forming a hollow printed structure according to aspects of this technology.

As described above, aspects of this technology relate to printed hollow bodies, such as bodies having an exterior cylindrical shape with a hollow interior, as well as methods for printing such hollow bodies, methods of printing within a hollow print base support structure, and systems for printing such hollow bodies. The methods and systems enable printing of the desired body from the outside-to-inside.

The term "layer" as used herein, unless otherwise noted or clear from the context, means a portion of a 3D printed structure that is one extruded 3-D print layer thick (e.g., one layer thick in the z-direction, radial direction, or thickness direction as those terms are used herein). A "layer" may include one continuous and uninterrupted 3D printed structure that forms an entire hollow structure of the hollow body, or it may include two or more separated portions of 3D printed material that are located at a common radial dimension from a rotational axis of the hollow body being printed. A "layer" need not completely cover a previously deposited layer (although it may do so). When a layer or hollow portion are described as extending "continuously" for 360 degrees and/or forming a "complete" 360 degree layer, this means that at least some continuous portion or path forming that layer extends continuously around the rotational axis of the surface or layer on which printing takes place. A "continuous" or "complete" 360 degree layer need not completely cover an earlier provided surface or layer. When desired to describe a layer that covers 100% of a previous layer in this specification, the term "fully covered" (or variants thereof) will be used. The term "fully covered" (or variants thereof), as used herein, means the interior surface of one layer is 100% covered by the overlaying layer. A "fully covered" layer may have its end surface(s) exposed and not covered by the overlaying layer. Additionally, a layer may "partially cover" (or variants thereof) another layer. A "partially covered" layer may have any percentage of its interior surface covered by the overlaying layer. As some more specific examples, a "partially covered" layer may have at least 25%, at least 40%, at least 50%, at least 60%, at least 70%, at least 80%, at least 90%, at least 95%, at least 98%, or even at least 99% of its interior surface area covered by an overlaying layer.

Three dimensional printing systems and methods are known, but most conventional 3D-printing systems utilize Cartesian coordinates ("x," "y," and "z" coordinates) in their print driver software to build the desired structures. While such systems can print cylindrical or rounded structures, the resultant parts typically do not have smooth or fine curved surfaces (at least right out of the printer) due to movement of the print head in the x, y, z coordinate directions when printing the rounded structures. Typically, such curved printed structures have anisotropy issues in their overall structure.

Cylindrical based 3D printers are known that print on the exterior surface of a rotating mandrel. Note, for example, U.S. Patent Appln. Publn. No. US 2012/0165969 A1 and Munigala, V., "Development and Design of a Cylindrical 3D Printer," Industrial Engineering, 10th International DAAAM Baltic Conference, May 12-13, 2015, Tallinn, Estonia. Each of U.S. Patent Appln. Publn. No. US 2012/0165969 A1 and this Munigala publication are incorporated herein by reference. These systems build up a hollow cylindrical body from the inside-to-outside, laying down the interior most layers first (directly on the mandrel surface) and then laying down additional layers on top of the first layer. Such systems and methods can create parts having a common interior diameter and/or size (based on the outer diameter/size of the mandrel that is later removed), but the exterior diameter/size can be varied (e.g., depending on the number of layers printed onto the initial layer).

Because these parts are built around the cylindrical exterior of the mandrel, the resultant interior surface of the printed structure has the cylindrical shape of the starting mandrel. If structures are needed in the interior of such printed cylinders, such as supports for sensors or other electronics, supports for attaching payload, etc., those interior structures must be added as separate components after printing is completed. It can be very time consuming and difficult, if not impossible, to accurately attach such internal structures on the cylinder body interior, particularly if the diameter of the body is relatively small.

Aspects of the present technology address some or all of these potential issues by providing systems and methods for 3D printing a hollow body, e.g., including hollow bodies have a cylindrical exterior surface, from the outside-to-inside direction. Such printed structures, systems, and/or methods may include one or more of the following advantages:

(a) avoid the labor intensive practices and waste generated by prior, non-3D printing techniques, such as lathing, milling, etc., (b) avoid the anisotropy issues produced in 3D printed cylindrical structures using conventional Cartesian coordinate printing and geometry, (c) produce printed hollow cylindrical structures having smooth exterior surfaces, (d) enable creation of desired internal structures (e.g., sensor and/or electronic mounts, payload supports, etc.) within the interior and on the interior surface of the hollow body directly as part of the 3D printing process (e.g., without the need to separately attach these structures), (e) allow creation of hollow objects having different diameters, transition regions, tapered regions, frusto-conical exterior structures, and/or frusto-ogive exterior structures, and (f) produce a 100% printed hollow cylindrical structure (optionally including printed interior mounts, supports, flanges, and/or other structures).

Other advantageous features are described and/or apparent from the description below. Printed hollow structures in accordance with at least some examples of this technology may be useful in various environments and/or for various end uses. As some more specific examples, printed hollow structures in accordance with at least some examples of this technology may be useful for producing rocket bodies, fuselages (e.g., for aircraft, for underwater vehicles, for submersibles, etc.), missile bodies, torpedo bodies, etc.

FIG. 1 illustrates an example printing system 1000 in accordance with some examples of this technology. This example printing system 1000 includes a system for 3D printing on an interior surface S located within an interior 102I of a hollow body 102, such as a hollow mandrel. This hollow body 102 constitutes the print support base (a base for supporting the print media material to be deposited) for this printing system 1000. The interior 102I of the hollow body 102 may have a cylindrical interior surface corresponding to the size (e.g., diameter when formed as a cylinder having a circular cross section) of the exterior surface of the hollow object to be printed. While the system 1000 shown in FIG. 1 includes a hollow body 102 having an exterior surface 102X that also has a cylindrical shape with a circular transverse cross section, other exterior surface shapes 102X are possible without departing from this technology. The interior surface S on which printing takes place for the first printed layer may constitute (at least in part) the interior surface of the hollow body 102. Layers printed thereafter may constitute (at least in part) printed layers formed on the previously printed layers located within the interior surface of the hollow body 102. The printing system 1000 further includes a print head 104 having a print nozzle 104N that may be oriented to dispense print media material 106 as extruded line(s) on the surface S. The print head 104 and the print nozzle 104N may include conventional structures for 3D printing as are known and used in the art (e.g., extrusion systems, etc.), and they may be supplied with print media material and controlled in dispensing the print media material in manners that are conventionally known and used in the 3D printing arts.

Additionally or alternatively, if desired, the interior surface S on which printing takes place for the first printed layer may constitute (at least in part) an internal component placed within (and optionally attached to) the hollow body 102 (such as a rolled, thin-walled tube, e.g., made of metal). This internal component, when used, may be removed from the printed body once printing is completed or it may remain attached to the printed body. In some examples, this type of internal component (when used) may itself have insufficient strength and/or rigidity for the final intended use of the product (e.g., as a rocket body, fuselage, etc.), but the internal printed layers, when completed, may reinforce the internal component so that it can remain part of the final and desired end use product.

A support system 110 rotatably supports the hollow body 102 so that the hollow body 102 may be rotated about a rotational axis 112 thereof. Any suitable support system 110 that supports rotation of a body may be used without departing from this technology. This illustrated example support system 110 includes two base supports 110B (although more or fewer may be provided) that engage the exterior surface 102X of the hollow body 102. These base supports 110B may include one or more rollers 110R having outer surfaces that engage the exterior surface 102X of the hollow body 102 to support rotation of the hollow body 102 along direction Θ about axis 112. Optionally, at least one roller 110R (and potentially more of the rollers 110R) may be a driven roller (e.g., driven by a servo driver, stepper motor, rotary motor, linear motor, and/or other motor under computer control) that itself drives rotation of the hollow body 102 (e.g., under driving force supplied by a motor under control of a computer control system 200, examples of which are described in more detail below). Additionally or alternatively, if desired, the rollers 110R may constitute (or be replaced by) gears or other toothed and/or intermeshing structures that engage corresponding gears or toothed and/or intermeshing structures provided on the exterior surface 102X of the hollow body 102.

As other options, if desired, the hollow body 102 may include an exterior toothed structure that engages a chain, belt, or other drive mechanism, and that chain, belt, or other drive mechanism may be driven by a sprocket, axle, or gear that is driven by a servo driver, stepper motor, linear motor, rotary motor, and/or other motor under computer control. Additionally or alternatively, computer controllable rotation systems, including rotation supporting component parts and structures of the types described in U.S. Patent Appln. Publn. No. US 2012/0165969 A1, the Munigala publication, and/or in other computer controlled cylinder rotational systems, may be used without departing from this technology. Computer controlled rotation of hollow body 102 is shown schematically in FIG. 1 as control line 202 extending from the computer control system 200 to drive and control hollow body 102 rotation about the Θ direction. Such structures as described above may correspond to "support systems for rotatably supporting a hollow body" and/or steps for "rotating" a hollow body as those terms are used in this specification.

FIG. 1 further shows a "print head support system" for supporting the print head 104. The print head support system supports the print head 104 so that the print nozzle 104N may be positionable adjacent an interior surface S located within the hollow body 102. As mentioned above, interior surface S may constitute the physical interior 102I surface of the actual hollow body 102 or a surface located within the interior 102I, e.g., that was previously printed onto that hollow body interior 102I surface (e.g., an exposed surface S of prior deposited print media material 106). This print head support system positions the print nozzle 104N at an appropriate position to dispense print media material 106 onto the interior surface S and thereby build up the thickness of the printed material within the interior 102I of the hollow body 102.

Two main print head support systems and features are shown in FIG. 1 (and these structures may constitute "print head support systems" as that term is used in this specification). First, the print head 104 itself is movably mounted on a guide rail 120. The guide rail 120 in this illustrated example extends completely and continuously through the interior 102I of the hollow body 102, from one end 102A to the other end 102B and beyond each of these ends 120A, 102B. The guide rail 120 of this example defines the "x" direction or parameter for this print system 1000. In the example shown in FIG. 1, the guide rail 120 orients the print head 104 so that the print nozzle 104N is arranged immediately adjacent the bottom of the interior 102I of the hollow body 102 or other surface S to deposit the print media material 106 onto surface S at this bottom location. If the print head 104 is moved in the x direction while dispensing print media material 106 (e.g., under control by the computer system 200, note control line 204), this action forms an extruded line of print media material 106 extending horizontally along the surface S at the bottom of the hollow body 102 (as shown in FIG. 1). Under computer control moving along the x direction shown in FIG. 1, the print head 104 moves in a direction parallel to the rotational axis 112 of the hollow body 102 (and optionally deposits print media material along this direction parallel to the rotational axis). The "x" direction may be horizontal in print systems 1000 in accordance with at least some aspects of this technology (and may correspond to the "first direction" referred to in some portions of this specification).

Second, as shown in FIG. 1, the guide rail 120 also is movably supported, e.g., to be movable in the "z" direction, which is perpendicular to the rotational axis direction 112 in the print system 1000 of FIG. 1. The "z" direction may be vertical in print systems 1000 in accordance with at least some aspects of this technology. In order to print multiple layers within the interior 102I of hollow body 102, the system 1000 moves the guide rail 120 (e.g., upward, optionally vertically) so that the print nozzle 104N does not drag along (and contact) the surface S on which printing is to take place. In this illustrated example, the guide rail 120 is supported at one end 120A by a first support base 130A and at the other end 120B by another support base 130B. These support bases 130A, 130B are located outside of the interior 102I of the hollow body 102 of the print support base 102. Guide rod 120 is movable, e.g., along slot 132B in support base 130B (and along a corresponding slot in the other support base 130A) to position the print head 104 in a "second" direction (e.g., in the vertical direction and/or other direction perpendicular to the "first" direction). Bases 130A, 130B, and their corresponding slots (e.g., 132B) may be positioned with respect to the rotational axis 112 and the hollow body 102 to appropriately position the guide rail 120 and print head 104 to enable printing on the surface S within the interior 102I of hollow body 102. Lines 206A and 206B in FIG. 1 illustrate computer control, by control system 200, of movement of the guide rail 120 along guide rail support bases 130A, 130B in the z direction in accordance with some examples of this technology.

If desired, two or more print heads 104 and/or print nozzles 104N may be provided on a guide rail 120. Additionally or alternatively, if desired, two or more guide rails 120 may be provided within a printing system 1000, and each guide rail 120 may support one or more print heads 104 and/or print nozzles 104N.

As noted above, examples of this technology further include a computer controlled (e.g., system 200) "print head moving system" that selectively moves the print head 104 with respect to the hollow body 102. The "support system for rotatably supporting a hollow body" and the two "print head support systems" described above also may be considered part of the "print head moving system" because these systems also contribute to relative motion between print head 104 and print surface S. Such print head moving systems further may selectively move the print head 104; (a) in a first direction parallel to the rotational axis 112 of the hollow body 102 (e.g., the x direction in FIG. 1, optionally horizontally in some printing systems 1000) and (b) in a second direction perpendicular to the first direction or perpendicular to the rotational axis 112 direction (e.g., the z direction in FIG. 1, optionally vertically in some printing systems 1000). The necessary and desired motions may be accomplished, for example, by electric signals from computer control system 200 controlling the location of the print head 104 along the guide rail 120 in the x direction (via line(s) 204), electric signals from computer control system 200 controlling the location of the guide rail 120 in the z direction (via line(s) 206A, 206B), and electric signals from computer control system 200 controlling rotation of hollow body 102 in the Θ direction. Any desired structures for moving the print head 104 in one or more of these directions may be used and may be included in this technology (and these structures constitute examples of "print head moving system(s)" as that term is used in this specification).

As some more specific examples, computer controllable print head moving systems for moving a 3D print head along each of the "x" direction and the "z" direction may include one or more linear motors or stepper motors (e.g., controlled by a drive, such as a servo drive) with belts (timing belts), ball screws, lead screws, linear guides, etc., to achieve the necessary positioning and motion of the print head 104. Additionally or alternatively, linear guides may be used to support the print head 104 (e.g., as part of guide rail 120) and/or belt(s), ball screw(s) and/or lead screw(s) may be used to control motion in the x direction and/or the z direction. Multiple motors may be used to drive the motion, and these motors work together under common control and/or may be in communication with one another, e.g., in manners as are known and used in the art. Systems and methods for controlling 3D print head movement and coordinating movement in multiple directions with selective activation of an extruder to dispense print media material are known in the art and commercially available, e.g., from Advanced Motion Controls of Camarillo, CA Other examples of print head movement control systems are described, for example, in U.S. Patent Appln. Publn. No. US 2012/0165969 A1, the Munigala publication, and/or in other conventionally known and commercially available computer controlled 3D printing systems.

The following describes various examples of structures for and manners in which the print head 104 and guide rail 120 supporting it may be placed within a printing system so the print head 104 resides within the interior 102I of a hollow body. In the printing system 1000 of FIG. 1, the guide rail support bases 130A, 130B are fixedly mounted and/or stationary with respect to the rotary base supports 110B. Also, the guide rail 120, optionally with the print head 104 engaged with it, is removable from and insertable into the guide rail support bases 130A, 130B. Those actions occur in this example printing system 1000 by: (a) moving guide rail 120 upward (for removal) or downward (for insertion) along slot 132B and a corresponding slot in base 130A and (b) moving the guide rail 120 outward (for removal) or inward (for insertion) along slots 134A, 134B in guide rail support bases 130A, 130B. Slots 1346, 134A connect with slot 132B, and the corresponding slot in base 130A to allow the guide rail 120 to move into and out of the support bases 130A, 130B. The ends 120A, 120B of the guide rail 120 may be shaped and/or equipped with appropriate hardware to enable coupling with mechanical structures and/or electronics located within one or more of slot 132B, the corresponding slot on support base 130A, slot 134A, and/or slot 134B to enable the movements and/or other actions necessary to control motion of the print head 104 in the x and z directions and/or to control extrusion of print media material 106.

Thus, in use, to begin a printing process using the system 1000 illustrated in FIG. 1, if necessary, the guide rail 120 and print head 104 are separated from the guide rail support bases 130A, 130B, e.g., via slots 132B, the corresponding slot on support base 130A, slot 134A, and/or slot 134B. Then, if necessary, a hollow body 102 may be mounted on the rotary base supports 110B in a manner to be rotatable about its axis 112. Any necessary engagement between the hollow body 102 and the rotation mechanism for it should be completed (e.g., intermeshing gears, engaging drive components, securing mounts on support bodies 110B, etc.). Then: (a) one end 120A, 120B of the guide rail 120 (optionally with the print head 104 mounted thereon) is inserted through one end 102A, 102B of the hollow body 102; (b) the ends 120A, 120B of the guide rail 120 are inserted into slots 134A, 134B of guide rail support bases 130A, 130B; (c) the guide rail 120 is moved to the back of slots 134A, 134B; and (d) the guide rail 120 is moved downward into slot 132B and the corresponding slot on support base 130A. If desired, a coupling system may engage the ends 120A, 120B of the guide rail 120 upon its insertion into the bases 130A, 130B and automatically move the guide rail to a desired location. Additionally or alternatively, if desired, an automated system may move the guide rail 120 upward and downward in the overall system and engage any mechanical and/or electrical coupling components to appropriate "load" and "unload" positions and/or into positions for printing and/or removal from the print system 1000. Alternatively, if desired, the loading and unloading of the guide rail 120 into support bases 130A, 130B may take place at least partially or fully manually. Other slots, slot shapes, and/or slot locations may be provided in bases 130A, 130B for loading and unloading the guide rail 120, if desired.

Figure 2:
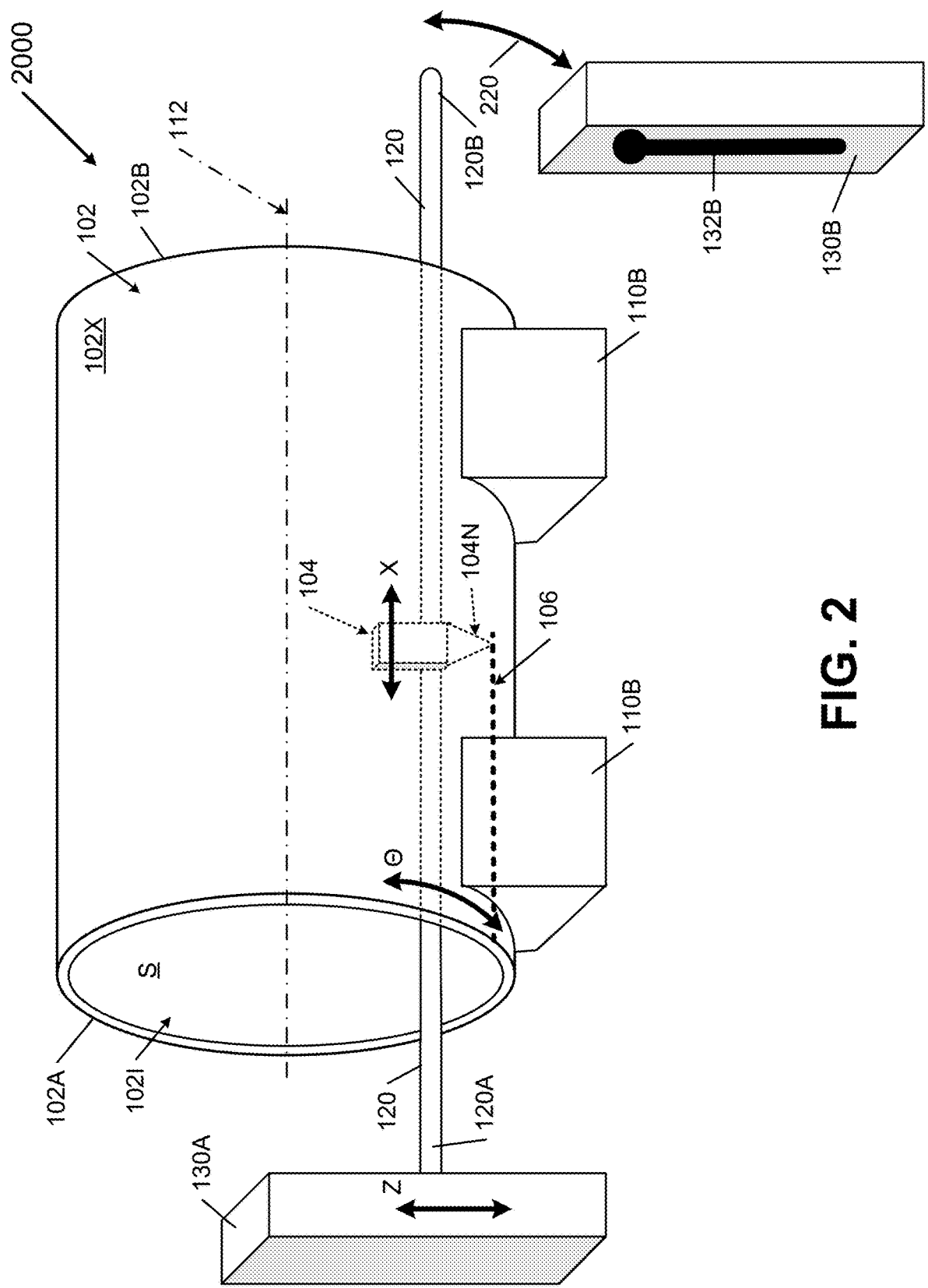
FIG. 2 illustrates another example of systems and methods for forming a hollow printed structure according to aspects of this technology.

Other ways of placing the print head 104 within the interior 102I of the hollow body 102 may be used. FIG. 2 shows a print system 2000 in accordance with some examples of this technology having similar parts and features to the print system 1000 of FIG. 1. When the same reference numbers used in FIG. 1 are used in FIG. 2, that reference number is intended to refer to the same or similar parts, and thus a complete detailed description thereof may be omitted. Also, while not all of the various items shown in FIG. 1 are shown in FIG. 2, one skilled in the art can understand, given benefit of this disclosure, that the print system 2000 of FIG. 2 may include any and/or all of the features described above in conjunction with FIG. 1.

In the example print system 2000 shown in FIG. 2, at least one of the guide rail support bases 130A, 130B is movable with respect to the rotary base supports 110B, and/or the rotatable hollow body 102. When the guide rail support base 130B is moved to a "load/unload" configuration, e.g., as shown in FIG. 2, the guide rail 120 (optionally with the print head 104 engaged with it) may be: (a) inserted into and/or removed from the interior 102I of the hollow body 102 and (b) engaged or disengaged from the guide rail support base 130A. When the guide rail 120 is removed from the hollow body 102, one hollow body 102 can be exchanged by another hollow body 102 and/or the hollow body 102 may be removed from the print system 2000, e.g., to enable the printed structure to be removed from its interior 102I, if desired. When loading the guide rail 120 into the print system 2000: (a) the guide rail 120 is inserted through open end 102б of the hollow body 102 while the support base 130B is in the load/unload configuration; (b) the end 120A of guide rail 120 is engaged with guide rail support 130A after passing through the interior 102I of the hollow body 102; and (c) the guide rail support base 130B is moved into place to engage the second end 120B of the guide rail 120 (e.g., to the position shown in FIG. 1, as indicated by arrow 220 in FIG. 2). Again, the ends 120A, 120B of the guide rail 120 may be shaped and/or equipped with appropriate hardware to enable coupling with mechanical structures and/or electronics located within one or more of slot 132B and/or a corresponding slot on support base 130A to enable the movements and/or other actions necessary to control motion of the print head 104 in the x and z directions and/or to control extrusion of print media material 106.

If desired, a coupling system may engage the ends 120A, 120B of the guide rail 120 upon its insertion into the bases 130A, 130B and automatically move the guide rail 120 to a desired location. Additionally or alternatively, if desired, an automated system may move the guide rail 120 upward and downward in the overall system to appropriate "loaded" and "unloaded" positions and/or into position for printing and/or removal from the print systems 1000 and/or 2000.

The movable base 130B in example print system 2000 may be movable in any desired manner and with any desired structure and/or mechanism without departing from this technology. As examples, the base 130B may be movably mounted on another base that is fixed, e.g., with respect to the rotary support bases 110B, the hollow body 102, and/or the other base 130A. As some more specific examples, the base 130B may rotate, slide, extend/retract, and/or linearly translate between a guide rail 120 "load/unload" configuration in which the base 130B is located out of the way and a "print" configuration in which the base 130B is appropriately positioned to support the guide rail 120 and facilitate printing. Movement of base 130B between the "load/unload" configuration and the "print" configuration may take place under computerized control, e.g., by a motor, servo drive, etc. Alternatively, if desired, the loading and unloading of the guide rail 120 into support bases 130A, 130B may take place at least partially or fully manually.

Figure 3:
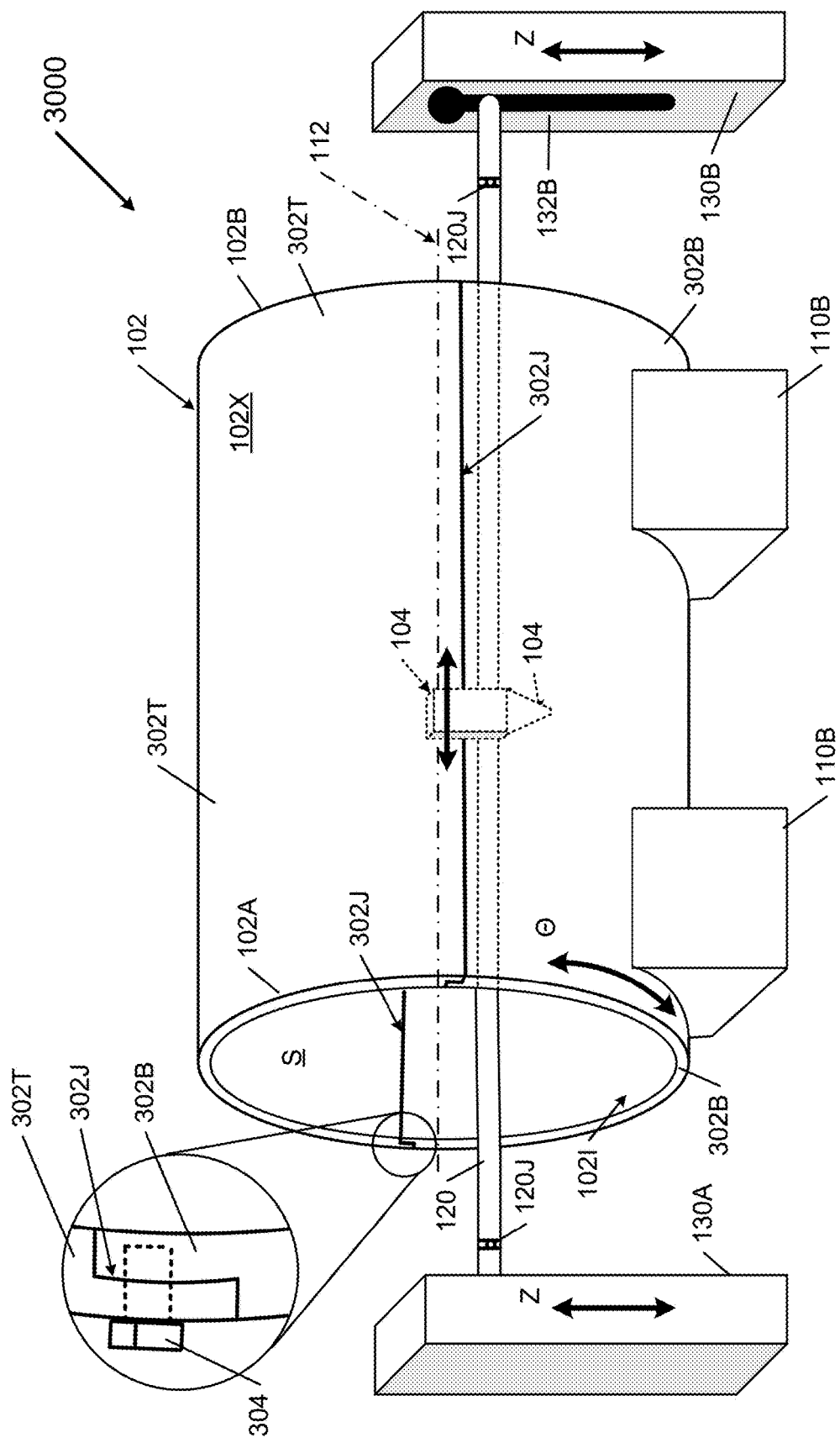
FIG. 3 illustrates another example of systems and methods for forming a hollow printed structure according to aspects of this technology.

FIG. 3 illustrates another example printing system 3000 that includes a different way of mounting the guide rail 120 and/or print head 104 with respect to a hollow body 102 to enable printing on a surface S located within the interior 102I of the hollow body 102. In the printing system 3000 of FIG. 3, the rotary base supports 110B, the guide rail supports 130A, 130B, and the guide rail 120 may be placed in preset positions with no hollow body 102 mounted on rotary supports 110B. Then, the hollow body 102 may be installed around the guide rail 120. In the printing system 3000 of FIG. 3, hollow body 102 constitutes a multi-part construction built around the guide rail 120. More specifically, with the rotary base supports 110B, the guide rail supports 130A, 130B, and the guide rail 120 set in place (optionally with the guide rail 120 in a somewhat central "mount" position as shown in FIG. 3), one hollow body part 302B (e.g., the bottom half of the hollow body 102) is mounted on rotary base supports 110B. The hollow body part 302B can be moved into place around the guide rail 120. Once body part 302B and guide rail 120 are in place, the other hollow body part 302T (e.g., the top half of hollow body 102) may be engaged with the first hollow body part 302B, thereby forming joints 302J. While overlapping joints 302J are shown in the example of FIG. 3, other joints are possible, such as dovetail joints, tongue-and-groove joints, a hinged joint, etc. If necessary or desired, the hollow body parts 302B, 302T may be joined together, such as by adhesives, mechanical connectors (e.g., one or more bolts 304 or other threaded connectors, rivets, fasteners, etc.), welded or other fused joints, etc. After the hollow body 102 is assembled (e.g., as shown in FIG. 3), printing on a surface S within its interior 102I may commence. Once printing is completed, the guide rail 120 and print head 104 may be removed from the hollow body 102 and printed structure (e.g., by one of the ways described above in conjunction with FIGS. 1 and 2), and the printed body may be removed from the interior 102I of the hollow body, if desired, e.g., by opening one or more of joints 302J.

Alternatively, if desired, in the printing system 3000 of FIG. 3, the guide rail 120 and print head 104 may be installed on guide rail support base(s) 130A, 130B (e.g., using any of the various systems described above in conjunction with FIGS. 1 and/or 2): (a) after the first hollow body part 302B is mounted on the rotary base supports 110B and before the second hollow body part 302T is joined to the first hollow body part 302B to create joints 302J or (b) after the second hollow body part 302T is joined to the first hollow body part 302B. Additionally or alternatively, if desired, the guide rail 120 may be assembled/disassembled in some manner (e.g., at joints 120J of FIG. 3) to enable it to be inserted into or removed from the hollow body 102 in any of the print systems 1000, 2000, and/or 3000 described herein. Such joint 120J may include a plug or other connection to allow power, data, and other communications to flow to the guide rail 120 and print head 104.

In the printing systems and methods described herein, the "support system for rotatably supporting a hollow body," the "print head support system," and/or the "print head moving system" may share components and/or component parts. Additionally or alternatively, individual components of the printing systems and methods may contribute to more than one type of motion of the print head 104 with respect to the surface S on which print media material 106 is deposited.

Hollow bodies 102 having multipart constructions, e.g., of the types described above in FIG. 3, also may be used in the example printing systems 1000, 2000 shown in FIGS. 1 and 2. Such multipart constructions may facilitate removal of the printed body from the hollow body 102, if desired to do so.

Figure 4:
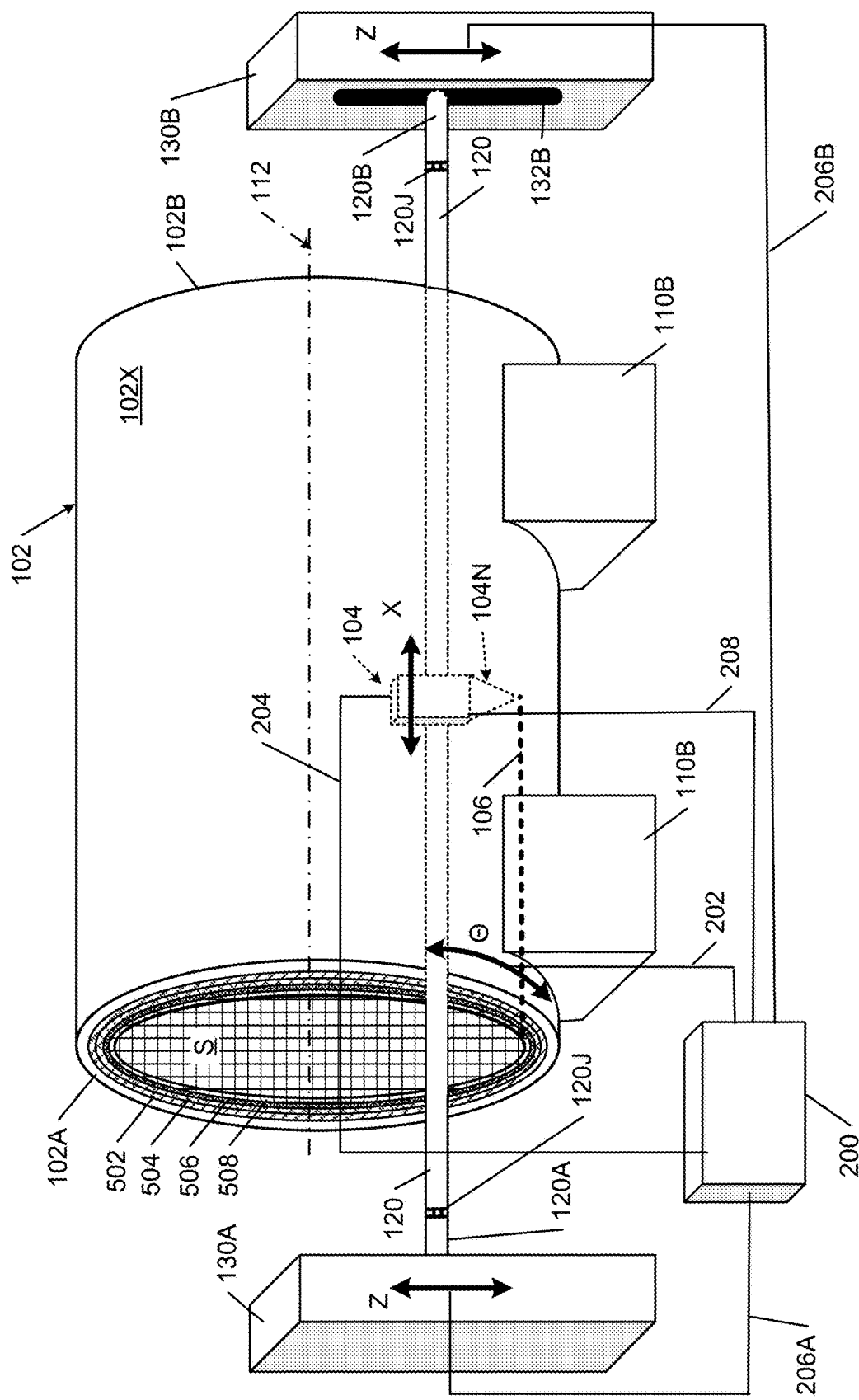
FIGS. 4, 5A, 5B, 5C, 5D, and 5E illustrate examples of use of systems and methods according to aspects of this technology to print a hollow structure from outside-to-inside.
Figure 5A:
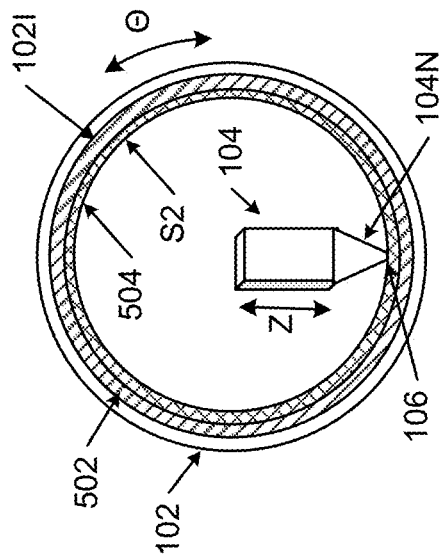
Figure 5B:
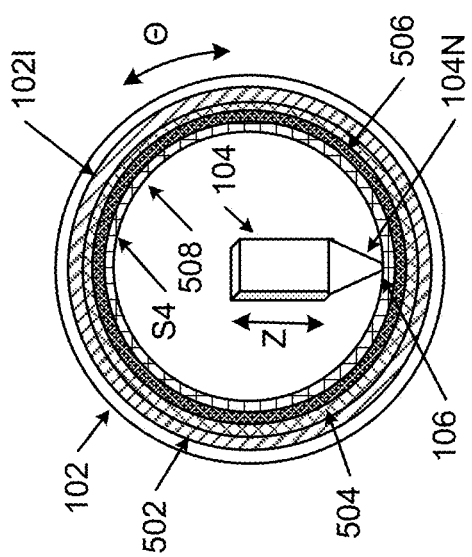
Figure 5C:
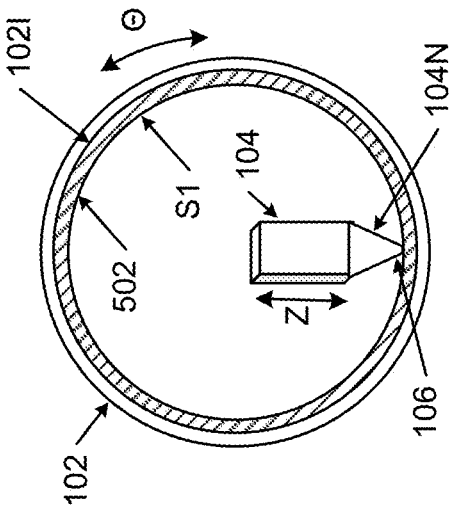
Figure 5D:
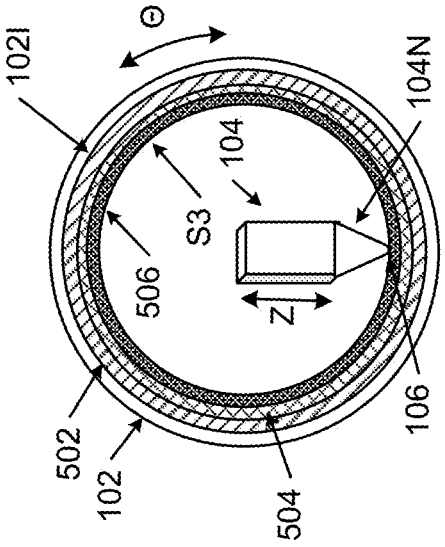
Figure 6:
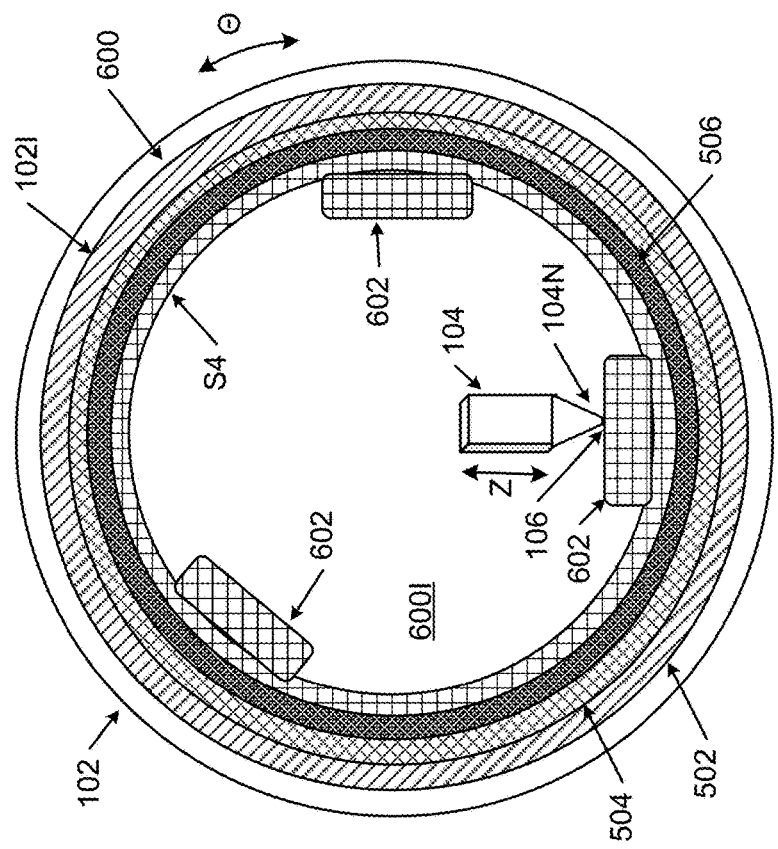
FIG. 6 illustrates examples of printed internal structures within printed hollow structures in accordance with some examples of this technology.

FIGS. 4 to 5D illustrate examples of printing a hollow, multi-layered printed structure 600 within the interior 102I of a hollow body 102, such as a hollow mandrel. FIGS. 5A-5D show transverse cross sectional views (perpendicular to the axial direction) of a hollow object as it is being printed using systems and methods in accordance with at least some examples of this technology. The cross-hatching patterns shown in FIGS. 4-6 are for purposes of visually distinguishing the different layers. The patterns are not intended to designate or indicate any particular material used in the layer and/or that layer's physical structure (e.g., extruded line directions, etc.). FIG. 5E shows a hollow printed body 600 produced by this example process, formed as a hollow cylinder with a circular transverse cross-section (although other shapes are possible). Any of the printing systems 1000, 2000, and/or 3000 and/or combinations of features from the printing systems 1000, 2000, and/or 3000 may be used to print such structures using this technology. A computer control system 200 (e.g., one or more computer processors that are programmed and adapted to) may control: (a) rotational motion of the hollow body 102 (e.g., via control line 202, in the Θ direction), (b) x-directional motion of the print head 104 along guide rail 120 (e.g., via control line 204), (c) z-directional motion of the guide rail 120 along the guide rail support system (e.g., including supports 130A, 130B, via control lines 206A, 206B), and (d) dispensing of print media material 106 through the print head nozzle 104N as extruded lines onto surface S within the interior 102I of the hollow body 102 (e.g., via control line 208). The print head 104 can be selectively controlled to dispense print media material 106 during any one or more of: (a) rotation of the hollow body 102 in the Θ direction, (b) x-directional motion of the print head 104 along guide rail 120, and/or (c) z-directional motion of the guide rail 120 on the guide rail support system 130A, 130B. By selectively controlling the above relative motions between the hollow body 102 and/or surface S and the print head 104 while also selectively extruding print media material 106 at appropriate times, extruded lines of print media material 106 may be deposited, e.g., one line and one layer at a time, within the interior of the hollow body 102. Multiple layers of print media material 106 may be built up on one another, one-by-one, until desired interior sizes and/or shapes are printed.

Turning to FIG. 5A, this figure shows the first layer 502 of print media material 106 deposited on the interior 102I surface of the hollow body 102. When printing of this layer 502 starts, the hollow body 102 interior surface is exposed, e.g., as shown in FIGS. 1-3, and the first layer 502 of print media material 106 is deposited directly on that interior surface. Once printed, the exposed surface of layer 502 forms a surface S1 within the interior 102I of the hollow body 102 onto which the next layer is printed. In this illustrated example, an entire layer 502 is printed, one extruded layer thick, 360 degrees around the interior surface 102I of the hollow body 102. The print nozzle 104N is moved in the x direction and the hollow body 102 is rotated in the Θ direction to deposit print media material 106, extruded line-by-extruded line, in a controlled manner until the complete first layer 502 is formed. At that time, the print head 104 and print nozzle 104N are moved (e.g., upward) approximately one extruded layer thickness by moving the guide rail 120 on guide rail supports 130A, 130B in the z-direction. First layer 502 may fully cover or partially cover the interior surface 102I of the hollow body 102.

Then, as shown in FIG. 5B, the second layer 504 of print media material 106 is deposited on the interior surface S1 of the first layer 502. When printing of this layer 504 starts, the interior surface S1 of the first layer 502 is exposed, e.g., as shown in FIG. 5A, and the second layer 504 of print media material 106 is deposited directly on the first layer 502. Once printed, the exposed surface of layer 504 forms a surface S2 within the interior of the hollow body 102 onto which the next layer is printed. In this illustrated example, an entire layer 504 is printed, one extruded layer thick, 360 degrees around the interior surface S1 of the first layer 502. The print nozzle 104N is moved in the x direction and the hollow body 102 is rotated in the Θ direction to deposit print media material 106, extruded line-by-extruded line, in a controlled manner until the complete second layer 504 is formed. At that time, the print head 104 and print nozzle 104N are moved (e.g., upward) approximately one extruded layer thickness by moving the guide rail 120 on guide rail supports 130A, 130B in the z-direction. Second layer 504 may fully cover or partially cover the interior surface of first layer 502.

Next, as shown in FIG. 5C, the third layer 506 of print media material 106 is deposited on the interior surface S2 of the second layer 504. When printing of this layer 506 starts, the interior surface S2 of the second layer 504 is exposed, e.g., as shown in FIG. 5B, and the third layer 506 of print media material 106 is deposited directly on the second layer 504. Once printed, the exposed surface of layer 506 forms a surface S3 within the interior of the hollow body 102 onto which the next layer is printed. In this illustrated example, an entire layer 506 is printed, one extruded layer thick, 360 degrees around the interior surface S2 of the second layer 504. The print nozzle 104N is moved in the x direction and the hollow body 102 is rotated in the Θ direction to deposit print media material 106, extruded line-by-extruded line, in a controlled manner until the complete third layer 506 is formed. At that time, the print head 104 and print nozzle 104N are moved (e.g., upward) approximately one extruded layer thickness by moving the guide rail 120 on guide rail supports 130A, 130B in the z-direction. Third layer 506 may fully cover or partially cover the interior surface of second layer 504.

Formation of the fourth layer 508 of this example is shown in FIG. 5D. As shown, the fourth layer 508 of print media material 106 is deposited on the interior surface S3 of the third layer 506. When printing of this layer 508 starts, the interior surface S3 of the third layer 506 is exposed, e.g., as shown in FIG. 5C, and the fourth layer 508 of print media material 106 is deposited directly on the third layer 506. Once printed, the exposed surface of layer 508 forms a surface S4 within the interior of the hollow body 102 onto which the next layer may be printed, if further layers are desired. In this illustrated example, an entire layer 508 is printed, one extruded layer thick, 360 degrees around the interior surface S3 of the third layer 506. The print nozzle 104N is moved in the x direction and the hollow body 102 is rotated in the Θ direction to deposit print media material 106, extruded line-by-extruded line, in a controlled manner until the complete fourth layer 508 is formed. At that time, the print head 104 and print nozzle 104N may be moved (e.g., upward), e.g., approximately one extruded layer thickness (by moving the guide rail 120 on guide rail supports 130A, 130B in the z-direction). Fourth layer 508 may fully cover or partially cover the interior surface of third layer 506.

If desired, one or more additional layers and/or partial layers and/or other structures may be printed, e.g., onto an interior surface S located within the hollow body 102, e.g., in a similar manner. Additionally or alternatively, the print media material 106 used in one layer (e.g., one of layers 502-508) may be the same or different from print media material 106 used in one or more of the other layers (e.g., other(s) of layer 502-508). As another additional or alternative feature, if desired, print medial material 106 need not be the same throughout any individual layer 502-508 in any one or more of the layers 502-508 (e.g., one part of an individual layer 502-508 may be formed from a different material than another part of that same layer 502-508).

Figure 5E:
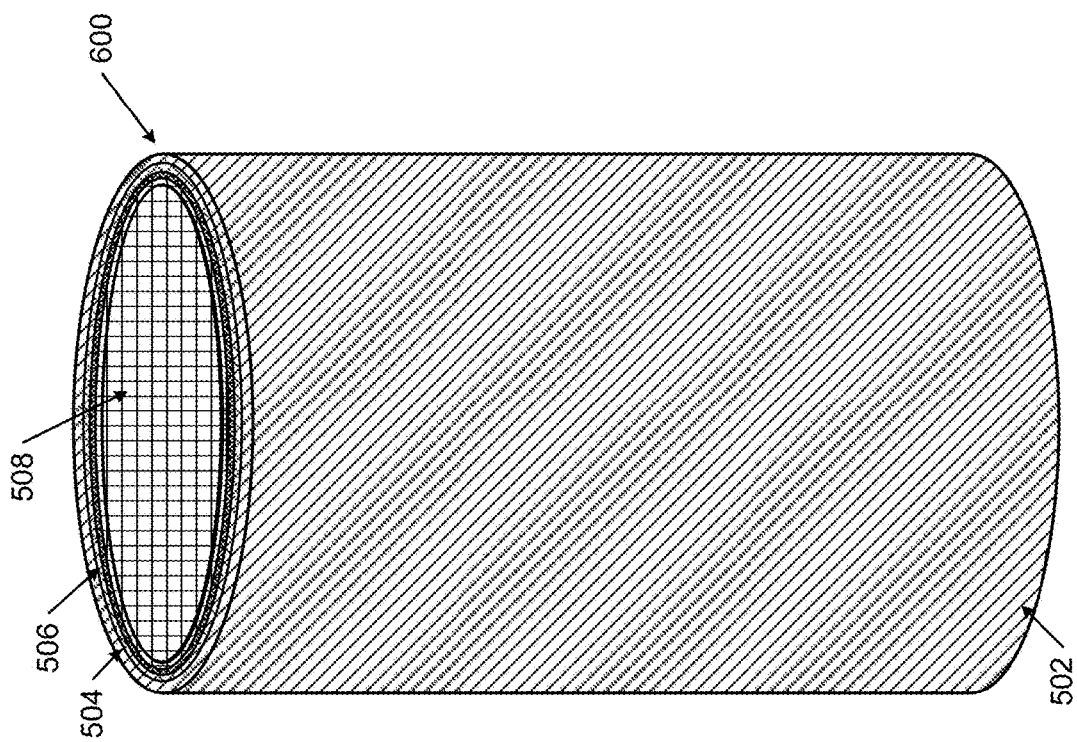

FIG. 5E illustrates a hollow printed body 600, e.g., formed by any of the systems 1000, 2000, and/or 3000 and methods described above in conjunction with FIGS. 1-5D. In this example, the hollow printed body 600 is 100% printed (e.g., comprising printed layers 502-508 in this example) and removed from the hollow body 102 in which it is formed. The outer diameter/size of outer layer 502 of this example corresponds to the size and shape of the interior 102I of the hollow body 102 in which it is formed. Any desired manner of removing the printed body 600 from the hollow body 102 may be used. For example, the combination of the printed body 600 within the hollow body 102 may be heated, e.g., so that the hollow body 102 expands and/or otherwise may be made more readily removable, which may then allow the printed body 600 to be more easily removed from the hollow body 102. As some additional examples, the hollow body 102 may be cut off, peeled off, melted off, dissolved off, slid off, broken off as pieces, etc. For hollow body 102 structures like those shown in FIG. 3, with one or more joints 302J, any mechanism (such as screws, bolts, mechanical fasteners, etc.) used to hold the parts 302B, 302T together may be disengaged, cut, etc., so that the body parts 302B, 302T can be removed from the outer surface of printed body 600. If necessary or desired, the exposed surface(s) of the printed body 600 (e.g., the inside, outside, and/or end surfaces) may be sanded, smoothed, coated, and/or otherwise treated and/or additional features may be added (such as channels, chambers, additional parts, components, etc.) for production into a final desired product.

The examples above describe formation of 360 degree complete layers within other layers and within the interior 102I of the hollow body 102. One advantageous aspect of this technology relates to the ability to print structures of different shapes (e.g., non-cylindrical shapes) within a hollow body 102. FIG. 6 shows an end view of an example of such a structure 600. More specifically, FIG. 6 shows an end view down a printed hollow structure 600 having multiple complete, 360 degree layers 502-508 of the types described above in conjunction with FIGS. 4-5E (although any desired number of layers may be provided). If desired, each layer 502-508 also may fully cover the preceding layer and/or surface or it may incompletely cover a previous layer and/or surface. When initiating printing on interior surface S4, however, the control system 200 does not form a complete new 360 degree layer and/or a fully covered layer. Rather, the control system 200 appropriately controls the extrusion of print media material 106, rotation of the hollow body 102, the x-directional motion of the print head 104, and z-directional motion of the guide rail 120/print head 104 to print one or more incomplete layers on the surface S4. By this process, as shown in FIG. 6, the interior 600I of the hollow printed structure 600 may have a non-cylindrical surface (at least in part). Rather, the interior 600I may be formed to include one or more additional printed structures 602 that extend radially inward from the printed layers 502-508. While any type of interior printed structures 602 may be formed, as some more specific examples, the interior printed structures 602 may constitute support bases (e.g., for sensors or other electronic equipment to be placed inside the hollow printed structure 600), anchor points, flanges, shelves, etc. Thus, while the entire structure 600 may be a printed structure—an integral, one-piece, printed structure (e.g., if removed from the hollow print support base 102)—the interior surface of the printed structure 600 need not be fully or even partially cylindrical and/or circular. Further, by controlling locations of extruded lines of print media material 106, channels and/or other openings for wires, electronics, or the like, may be formed within one or more layers and/or extending through one or more layers of the printed structure 600. The structures 602 shown in FIG. 6 may be located at the same or different axial positions and/or may originate at the same or different layers. These structures 602 may extend in the x-direction, the z-direction, and/or the Θ-direction for any desired extents.

Any desired type of print media material 106 may be used in systems and methods in accordance with examples of this technology. In at least some examples of this technology, carbon fiber reinforced 3D printing media material 106 will be used. Such carbon fiber based 3D print media materials are known in the art and are known to be strong, lightweight, and durable. Carbon fiber reinforced 3D printing media material 106 (e.g., carbon reinforcing fibers dispersed in a thermoplastic or thermoset base print media material) may be used in accordance with at least some examples this technology.

As described above, computer control system 200 can selectively control: (a) relative motion of the print head 104 with respect to the surface S on which print media material is to be deposited in the x-direction (e.g., by moving print head 104 along guide rail 120), (b) relative motion of the print head 104 with respect to the surface S on which print media material is to be deposited in the Θ-direction (e.g., by rotation of the hollow body 102 on rotary supports 110B), (c) relative motion of the print head 104 with respect to the surface S on which print media material is to be deposited in the z-direction (e.g., by movement of the guide rail 120 via guide rail support members 130A, 130B), and (d) dispensing of print media material 106 during any one or more of those types of relative motion. By controlling motion while print media material 106 is being deposited by the print nozzle 104N, the direction of the extruded lines of print medial material 106 along the surface S on which it is being deposited can be controlled and altered. When print media material 106 includes fiber reinforcements (such as carbon fibers), the direction of extrusion (e.g., of thin lines of extruded print media material 106) tends to generally align the reinforcing fibers along the direction of the extruded line. By varying the extrusion line direction in different layers of a printed body, the strength of the overall printed body can be improved. FIGS. 7-10 provide some examples of different alignments of extruded lines of print media material layers 502-508 and the manner in which systems and methods in accordance with some examples of this technology may produce such different alignments.

More specifically, FIGS. 7-10 show alternative views of a small portion 600A of an exterior surface of a printed body 600 (e.g., as shown in FIG. 6)—looking directly in the z-direction from the outside toward rotational axis 112—with portions of various layers 502, 504, 506 removed to expose underlying layers 504, 506, 508 in the z-direction (the thickness direction). Individual bands 502L, 504L, 506L, 508L shown in these figures represent individual lines of extruded print media material 106 deposited on a surface S within the hollow body 102 (with the layer 502 extruded first onto the interior surface 102I of the hollow body 102, then layer 504 deposited on layer 502, layer 506 deposited on layer 504, and layer 508 deposited on layer 506). FIGS. 7-10 illustrate examples of varying the directions of extruded lines of print media material 106 and, in at least some examples, varying the orientation direction of reinforcing fibers (e.g., carbon fibers) provided in the various layers 502-508. The following describes example manners in which the control system 200 may control: (a) relative motion of the print head 104 with respect to the surface S on which print media material 106 is to be deposited in the x-direction, (b) relative motion of the print head 104 with respect to the surface S on which print media material 106 is to be deposited in the Θ-direction, (c) relative motion of the print head 104 with respect to the surface S on which print media material 106 is to be deposited in the z-direction, and (d) dispensing of print media material 106 during any one or more of those types of relative motion to create the printed body 600 structures shown in FIGS. 7-10. Any variation in order of extrusion direction and/or reinforcing fiber alignment in the various layers (including no variation between adjacent layers, if desired) may be used without departing from aspects of this technology.

Figure 7:
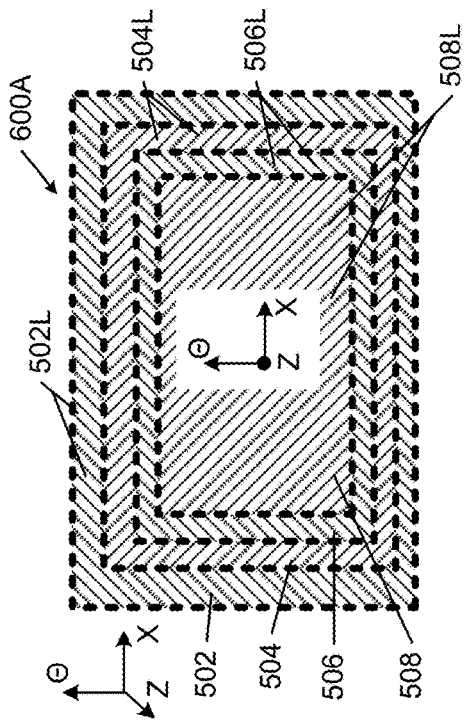
FIGS. 7, 8, 9, and 10 illustrate examples of multiple layers and different fiber orientations for printed structures in accordance with some examples of this technology.

Production of the printed structure 600A shown in FIG. 7 may include the following steps:

(a) printing first layer 502 by extruding print media material 106 as follows: (i) activating the print nozzle 104N to dispense print media material 106 while the hollow body 102 rotates in the Θ-direction through 0 degrees to 360 degrees to form a first complete 360 degree band 502L of print media material 106 around the Θ-direction; (ii) once the first complete band 502L is printed, moving the print head 104 in the x-direction less than or equal to one extruded band 502L width (print media material 106 may continue to be dispensed or may be stopped during this x-direction motion); (iii) dispensing print media material 106 while the hollow body 102 rotates in the Θ-direction through 0 degrees to 360 degrees to form an adjacent complete 360 degree band 502L of print media material 106 around the Θ-direction; and (iv) repeating these steps for each band 502L until the complete first layer 502 is printed;

(b) moving the print head 104 in the z-direction, e.g., approximately the thickness of first layer 502;

(c) printing second layer 504 by extruding print media material 106 as follows: (i) activating the print nozzle 104N to dispense print media material 106 while the print head 104 is moved in the x-direction to form a first axial band 504L of print media material 106 from one end of the desired axial length of the printed body 600 for that band 504L to the other end of the desired axial length of the printed body 600 for that band 504L; (ii) once the first axial band 504L is printed, rotating the hollow body 102 in the Θ-direction less than or equal to one extruded band 504L width (print media material 106 may continue to be dispensed or may be stopped during this Θ-direction motion); (iii) dispensing print media material 106 while the print head 104 is moved in the x-direction to form a second adjacent axial band 504L of print media material 106 from one end of the desired axial length of the printed body 600 for that band 504L to the other end of the desired axial length of the printed body 600 for that band 504L; and (iv) repeating these steps for each band 504L until the complete second layer 504 is printed;

(d) moving the print head 104 in the z-direction, e.g., approximately the thickness of second layer 504;

(e) printing third layer 506 by extruding print media material 106 as follows: (i) activating the print nozzle 104N to dispense print media material 106 while the hollow body 102 rotates in the Θ-direction through 0 degrees to 360 degrees to form a first complete 360 degree band 506L of print media material 106 around the Θ-direction; (ii) once the first complete band 506L is printed, moving the print head 104 in the x-direction less than or equal to one extruded band 506L width (print media material 106 may continue to be dispensed or may be stopped during this x-direction motion); (iii) dispensing print media material 106 while the hollow body 102 rotates in the Θ-direction through 0 degrees to 360 degrees to form an adjacent complete 360 degree band 506L of print media material 106 around the Θ-direction; and (iv) repeating these steps for each band 506L until the complete third layer 506 is printed;

(f) moving the print head 104 in the z-direction, e.g., approximately the thickness of third layer 506;

(g) printing fourth layer 508 by extruding print media material 106 as follows: (i) activating the print nozzle 104N to dispense print media material 106 while the print head 104 is moved in the x-direction to form a first axial band 508L of print media material 106 from one end of the desired axial length of the printed body 600 for that band 508L to the other end of the desired axial length of the printed body 600 for that band 508L; (ii) once the first axial band 508L is printed, rotating the hollow body 102 in the Θ-direction less than or equal to one extruded band 508L width (print media material 106 may continue to be dispensed or may be stopped during this Θ-direction motion); (iii) dispensing print media material 106 while the print head 104 is moved in the x-direction to form a second adjacent axial band 508L of print media material 106 from one end of the desired axial length of the printed body 600 for that band 508L to the other end of the desired axial length of the printed body 600 for that band 508L; and (iv) repeating these steps for each band 508L until the complete fourth layer 508 is printed;

(h) print any additional desired printed layers or partial printed layers (with the extruded bands and/or fiber reinforcing material oriented in any desired direction (s)); and (i) removing the printed body 600 from the hollow print support body 102 (if necessary or desired).

In this manner, as shown in FIG. 7, adjacent layers of the printed body 600 include layers of extruded bands of print media material 106 oriented in the Θ-direction and the x-direction (e.g., axial direction). In the specific example of FIG. 7, the bands 502L-508L of adjacent layers 502-508 may be oriented perpendicular to one another; the bands 502L of the first layer 502 and the bands 506L of the third layer 506 may be oriented parallel to one another; and the bands 504L of the second layer 504 and the bands 508L of the fourth layer 508 may be oriented parallel to one another.

Figure 8:
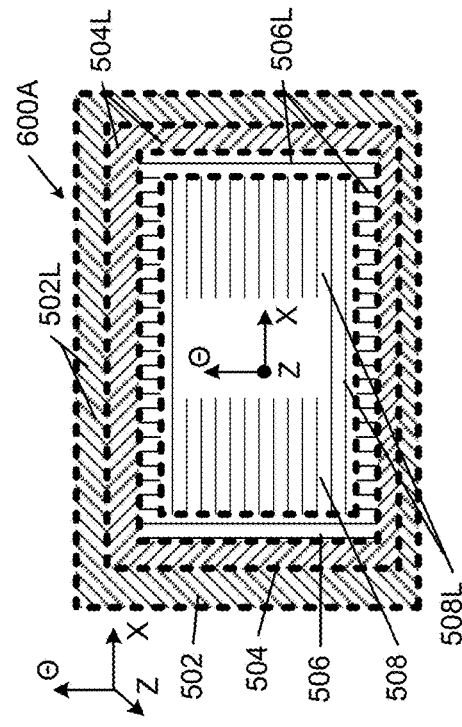

Production of the printed structure 600A shown in FIG. 8 may include the following steps:

(a) printing first layer 502 by extruding print media material 106 as follows: (i) activating the print nozzle 104N to dispense print media material 106 while the hollow body 102 rotates in the Θ-direction and while the print head 104 is moved in the x-direction from one end of the desired axial length of the printed body 600 for that band 502L to the other end of the desired axial length of the printed body 600 for that band 502L to form a first complete band 502L of print media material 106 (rotation in the Θ-direction may occur through any portion of a complete rotation or through multiple rotations when forming the first extruded band 502L); (ii) once the first complete band 502L is printed, rotating the hollow body 102 in the Θ-direction less than or equal to one extruded band 502L width (print media material 106 may continue to be dispensed or may be stopped during this Θ-direction motion); (iii) activating the print nozzle 104N to dispense print media material 106 while the hollow body 102 rotates in the Θ-direction and while the print head 104 is moved in the x-direction from one end of the desired axial length of the printed body 600 for that band 502L to the other end of the desired axial length of the printed body 600 for that band 502L to form a second complete band 502L of print media material 106 (rotation in the Θ-direction may occur through any portion of a complete rotation or through multiple rotations when forming the second extruded band 502L)—the x-direction motion of the print head 104 and the rotary Θ-direction (clockwise or counterclockwise) motion of the hollow body 102 are controlled so that the second extruded band 502L is deposited to overlap and extend in parallel to the first extruded band 502L; and (iv) repeating these steps for each band 502L until the complete first layer 502 is printed;

(b) moving the print head 104 in the z-direction, e.g., approximately the thickness of first layer 502;

(c) printing second layer 504 by extruding print media material 106 as follows: (i) activating the print nozzle 104N to dispense print media material 106 while the hollow body 102 rotates in the Θ-direction and while the print head 104 is moved in the x-direction from one end of the desired axial length of the printed body 600 for that band 504L to the other end of the desired axial length of the printed body 600 for that band 504L to form a first complete band 504L of print media material 106 (rotation in the Θ-direction may occur through any portion of a complete rotation or through multiple rotations when forming the first extruded band 504L); (ii) once the first complete band 504L is printed, rotating the hollow body 102 in the Θ-direction less than or equal to one extruded band 504L width (print media material 106 may continue to be dispensed or may be stopped during this Θ-direction motion); (iii) activating the print nozzle 104N to dispense print media material 106 while the hollow body 102 rotates in the Θ-direction and while the print head 104 is moved in the x-direction from one end of the desired axial length of the printed body 600 for that band 504L to the other end of the desired axial length of the printed body 600 for that band 504L to form a second complete band 504L of print media material 106 (rotation in the Θ-direction may occur through any portion of a complete rotation or through multiple rotations when forming the second extruded band 504L)—the x-direction motion of the print head 104 and the rotary Θ-direction (clockwise or counterclockwise) motion of the hollow body 102 are controlled so that the second extruded band 504L is deposited to overlap and extend in parallel to the first extruded band 504L; and (iv) repeating these steps for each band 504L until the complete second layer 504 is printed—the x-direction motion of the print head 104 and the rotary Θ-direction (clockwise or counterclockwise) motion of the hollow body 102 also are controlled so that the extruded bands 504L of the second layer 504 extend in a different direction (e.g., perpendicular) from the direction at which the first extruded bands 502L extend;

(d) moving the print head 104 in the z-direction, e.g., approximately the thickness of second layer 504;

(e) printing third layer 506 by extruding print media material 106 as follows: (i) activating the print nozzle 104N to dispense print media material 106 while the hollow body 102 rotates in the Θ-direction and while the print head 104 is moved in the x-direction from one end of the desired axial length of the printed body 600 for that band 506L to the other end of the desired axial length of the printed body 600 for that band 506L to form a first complete band 506L of print media material 106 (rotation in the Θ-direction may occur through any portion of a complete rotation or through multiple rotations when forming the first extruded band 506L); (ii) once the first complete band 506L is printed, rotating the hollow body 102 in the Θ-direction less than or equal to one extruded band 506L width (print media material 106 may continue to be dispensed or may be stopped during this Θ-direction motion); (iii) activating the print nozzle 104N to dispense print media material 106 while the hollow body 102 rotates in the Θ-direction and while the print head 104 is moved in the x-direction from one end of the desired axial length of the printed body 600 for that band 506L to the other end of the desired axial length of the printed body 600 for that band 506L to form a second complete band 506L of print media material 106 (rotation in the Θ-direction may occur through any portion of a complete rotation or through multiple rotations when forming the second extruded band 502L)—the x-direction motion of the print head 104 and the rotary Θ-direction (clockwise or counterclockwise) motion of the hollow body 102 are controlled so that the second extruded band 506L is deposited to overlap and extend in parallel to the first extruded band 506L; and (iv) repeating these steps for each band 506L until the complete third layer 506 is printed—the x-direction motion of the print head 104 and the rotary Θ-direction (clockwise or counterclockwise) motion of the hollow body 102 also are controlled so that the extruded bands 506L of the third layer 506 extend in a different direction (e.g., perpendicular) from the direction at which the second extruded bands 504L extend and in the same or a different direction at which the first extruded bands 502L extend;

(f) moving the print head 104 in the z-direction, e.g., approximately the thickness of third layer 506;

(g) printing fourth layer 508 by extruding print media material 106 as follows: (i) activating the print nozzle 104N to dispense print media material 106 while the hollow body 102 rotates in the Θ-direction and while the print head 104 is moved in the x-direction from one end of the desired axial length of the printed body 600 for that band 508L to the other end of the desired axial length of the printed body 600 for that band 508L to form a first complete band 508L of print media material 106 (rotation in the Θ-direction may occur through any portion of a complete rotation or through multiple rotations when forming the first extruded band 508L); (ii) once the first complete band 508L is printed, rotating the hollow body 102 in the Θ-direction less than or equal to one extruded band 508L width (print media material 106 may continue to be dispensed or may be stopped during this Θ-direction motion); (iii) activating the print nozzle 104N to dispense print media material 106 while the hollow body 102 rotates in the Θ-direction and while the print head 104 is moved in the x-direction from one end of the desired axial length of the printed body 600 for that band 508L to the other end of the desired axial length of the printed body 600 for that band 508L to form a second complete band 508L of print media material 106 (rotation in the Θ-direction may occur through any portion of a complete rotation or through multiple rotations when forming the second extruded band 508L)—the x-direction motion of the print head 104 and the rotary Θ-direction (clockwise or counterclockwise) motion of the hollow body 102 are controlled so that the second extruded band 508L is deposited to overlap and extend in parallel to the first extruded band 508L; and (iv) repeating these steps for each band 508L until the complete fourth layer 508 is printed—the x-direction motion of the print head 104 and the rotary Θ-direction (clockwise or counterclockwise) motion of the hollow body 102 are controlled so that the extruded bands 508L of the fourth layer 508 extend in a different direction (e.g., perpendicular) from the direction at which the third extruded bands 506L extend and in the same or a different direction at which the second extruded bands 504L or the first extruded bands 502L extend;

(h) print any additional desired printed layers or partial printed layers (with the extruded bands and/or fiber reinforcing material oriented in any desired direction (s)); and (i) removing the printed body 600 from the hollow print support body 102 (if necessary or desired).

In this manner, as shown in FIG. 8, adjacent layers of the printed body 600 include layers of extruded bands of print media material oriented in two or more diagonal directions across the printed body 600. Optionally, as shown in FIG. 8, the bands 502L-508L of adjacent layers 502-508 may be oriented perpendicular to one another; the bands 502L of the first layer 502 and the bands 506L of the third layer 506 may be oriented parallel to one another; and the bands 504L of the second layer 504 and the bands 508L of the fourth layer 508 may be oriented parallel to one another.

Figure 9:
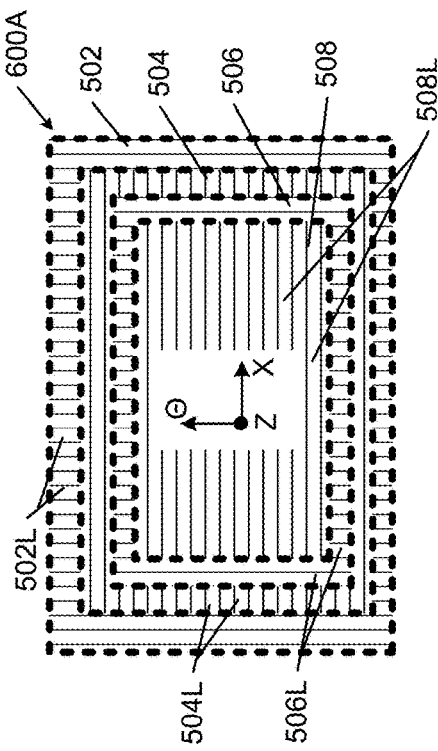

Production of the printed structure 600A shown in FIG. 9 may include the following steps:

(a) printing first layer 502 by extruding print media material 106 as follows: (i) activating the print nozzle 104N to dispense print media material 106 while the hollow body 102 rotates in the Θ-direction and while the print head 104 is moved in the x-direction from one end of the desired axial length of the printed body 600 for that band 502L to the other end of the desired axial length of the printed body 600 for that band 502L to form a first complete band 502L of print media material 106 (rotation in the Θ-direction may occur through any portion of a complete rotation or through multiple rotations when forming the first extruded band 502L); (ii) once the first complete band 502L is printed, rotating the hollow body 102 in the Θ-direction less than or equal to one extruded band 502L width (print media material 106 may continue to be dispensed or may be stopped during this Θ-direction motion); (iii) activating the print nozzle 104N to dispense print media material 106 while the hollow body 102 rotates in the Θ-direction and while the print head 104 is moved in the x-direction from one end of the desired axial length of the printed body 600 for that band 502L to the other end of the desired axial length of the printed body 600 for that band 502L to form a second complete band 502L of print media material 106 (rotation in the Θ-direction may occur through any portion of a complete rotation or through multiple rotations when forming the second extruded band 502L)—the x-direction motion of the print head 104 and the rotary Θ-direction (clockwise or counterclockwise) motion of the hollow body 102 are controlled so that the second extruded band 502L is deposited to overlap and extend in parallel to the first extruded band 502L; and (iv) repeating these steps for each band 502L until the complete first layer 502 is printed;

(b) moving the print head 104 in the z-direction, e.g., approximately the thickness of first layer 502;

(c) printing second layer 504 by extruding print media material 106 as follows: (i) activating the print nozzle 104N to dispense print media material 106 while the hollow body 102 rotates in the Θ-direction through 0 degrees to 360 degrees to form a first complete 360 degree band 504L of print media material 106 around the Θ-direction; (ii) once the first complete band 504L is printed, moving the print head 104 in the x-direction less than or equal to one extruded band 504L width (print media material 106 may continue to be dispensed or may be stopped during this x-direction motion); (iii) dispensing print media material 106 while the hollow body 102 rotates in the Θ-direction through 0 degrees to 360 degrees to form an adjacent complete band 504L of print media material 106 around the Θ-direction; and (iv) repeating these steps for each band 504L until the complete third layer 504 is printed;

(d) moving the print head 104 in the z-direction, e.g., approximately the thickness of second layer 504;

(e) printing third layer 506 by extruding print media material 106 as follows: (i) activating the print nozzle 104N to dispense print media material 106 while the hollow body 102 rotates in the Θ-direction and while the print head 104 is moved in the x-direction from one end of the desired axial length of the printed body 600 for that band 506L to the other end of the desired axial length of the printed body 600 for that band 506L to form a first complete band 506L of print media material 106 (rotation in the Θ-direction may occur through any portion of a complete rotation or through multiple rotations when forming the first extruded band 506L); (ii) once the first complete band 506L is printed, rotating the hollow body 102 in the Θ-direction less than or equal to one extruded band 506L width (print media material 106 may continue to be dispensed or may be stopped during this Θ-direction motion); (iii) activating the print nozzle 104N to dispense print media material 106 while the hollow body 102 rotates in the Θ-direction and while the print head 104 is moved in the x-direction from one end of the desired axial length of the printed body 600 for that band 506L to the other end of the desired axial length of the printed body 600 for that band 506L to form a second complete band 506L of print media material 106 (rotation in the Θ-direction may occur through any portion of a complete rotation or through multiple rotations when forming the second extruded band 506L)—the x-direction motion of the print head 104 and the rotary Θ-direction (clockwise or counterclockwise) motion of the hollow body 102 are controlled so that the second extruded band 506L is deposited to overlap and extend in parallel to the first extruded band 506L; and (iv) repeating these steps for each band 506L until the complete third layer 506 is printed—the x-direction motion of the print head 104 and/or the rotary Θ-direction (clockwise or counterclockwise) motion of the hollow body 102 are controlled so that the extruded bands 506L of the third layer 506 extend in the same direction or a different direction (e.g., perpendicular) from the direction at which the first extruded bands 502L extend;

(f) moving the print head 104 in the z-direction, e.g., approximately the thickness of third layer 506;

(g) printing fourth layer 508 by extruding print media material 106 as follows: (i) activating the print nozzle 104N to dispense print media material 106 while the print head 104 is moved in the x-direction to form a first axial band 508L of print media material 106 from one end of the desired axial length of the printed body 600 for that band 508L to the other end of the desired axial length of the printed body 600 for that band 508L; (ii) once the first axial band 508L is printed, rotating the hollow body 102 in the Θ-direction less than or equal to one extruded band 508L width (print media material 106 may continue to be dispensed or may be stopped during this Θ-direction motion); (iii) dispensing print media material 106 while the print head 104 is moved in the x-direction to form a second axial band 508L of print media material 106 from one end of the desired axial length of the printed body 600 for that band 508L to the other end of the desired axial length of the printed body 600 for that band 508L; and (iv) repeating these steps for each band 508L until the complete fourth layer 508 is printed;

(h) print any additional desired printed layers or partial printed layers (with the extruded bands and/or fiber reinforcing material oriented in any desired direction(s)); and (i) removing the printed body 600 from the hollow print support body 102 (if necessary or desired).

In this manner, as shown in FIG. 9, adjacent layers of the printed body 600 include layers of extruded bands of print media material 106 oriented in multiple different directions through the printed body 600. Optionally, as shown in FIG. 9, the bands 502L of the first layer 502 and the bands 506L of the third layer 506 may be oriented perpendicular to one another; the bands 504L of the second layer 504 and the bands 508L of the fourth layer 508 may be oriented perpendicular to one another; and none of these sets of bands 502L-508L are parallel to one another.

Figure 10:
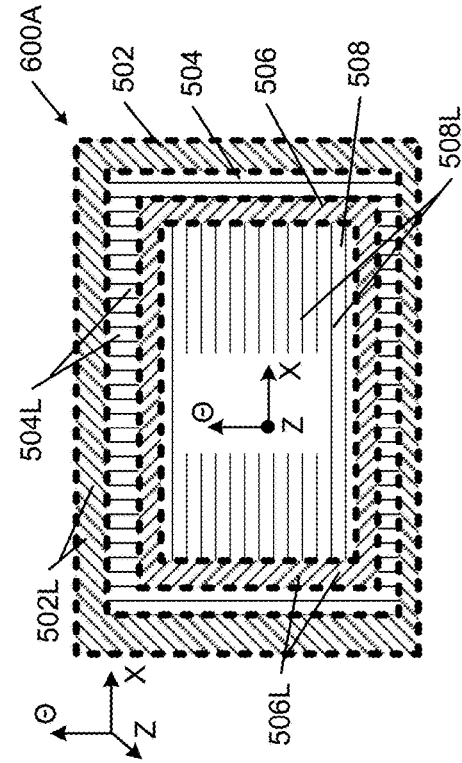

Production of the printed structure 600A shown in FIG. 10 may include the following steps:

(a) printing first layer 502 by extruding print media material 106 as follows: (i) activating the print nozzle 104N to dispense print media material 106 while the hollow body 102 rotates in the Θ-direction and while the print head 104 is moved in the x-direction from one end of the desired axial length of the printed body 600 for that band 502L to the other end of the desired axial length of the printed body 600 for that band 502L to form a first complete band 502L of print media material 106 (rotation in the Θ-direction may occur through any portion of a complete rotation or through multiple rotations when forming the first extruded band 502L); (ii) once the first complete band 502L is printed, rotating the hollow body 102 in the Θ-direction less than or equal to one extruded band 502L width (print media material 106 may continue to be dispensed or may be stopped during this Θ-direction motion); (iii) activating the print nozzle 104N to dispense print media material 106 while the hollow body 102 rotates in the Θ-direction and while the print head 104 is moved in the x-direction from one end of the desired axial length of the printed body 600 for that band 502L to the other end of the desired axial length of the printed body 600 for that band 502L to form a second complete band 502L of print media material 106 (rotation in the Θ-direction may occur through any portion of a complete rotation or through multiple rotations when forming the second extruded band 502L)—the x-direction motion of the print head 104 and the rotary Θ-direction (clockwise or counterclockwise) motion of the hollow body 102 are controlled so that the second extruded band 502L is deposited to overlap and extend in parallel to the first extruded band 502L; and (iv) repeating these steps for each band 502L until the complete first layer 502 is printed;

(b) moving the print head 104 in the z-direction, e.g., approximately the thickness of first layer 502;

(c) printing second layer 504 by extruding print media material 106 as follows: (i) activating the print nozzle 104N to dispense print media material 106 while the hollow body 102 rotates in the Θ-direction and while the print head 104 is moved in the x-direction from one end of the desired axial length of the printed body 600 for that band 504L to the other end of the desired axial length of the printed body 600 for that band 504L to form a first complete band 504L of print media material 106 (rotation in the Θ-direction may occur through any portion of a complete rotation or through multiple rotations when forming the first extruded band 504L); (ii) once the first complete band 504L is printed, rotating the hollow body 102 in the Θ-direction less than or equal to one extruded band 504L width (print media material 106 may continue to be dispensed or may be stopped during this Θ-direction motion); (iii) activating the print nozzle 104N to dispense print media material 106 while the hollow body 102 rotates in the Θ-direction and while the print head 104 is moved in the x-direction from one end of the desired axial length of the printed body 600 for that band 504L to the other end of the desired axial length of the printed body 600 for that band 504L to form a second complete band 504L of print media material 106 (rotation in the Θ-direction may occur through any portion of a complete rotation or through multiple rotations when forming the second extruded band 504L)—the x-direction motion of the print head 104 and the rotary Θ-direction (clockwise or counterclockwise) motion of the hollow body 102 are controlled so that the second extruded band 504L is deposited to overlap and extend in parallel to the first extruded band 504L; and (iv) repeating these steps for each band 504L until the complete second layer 504 is printed—the x-direction motion of the print head 104 and the rotary Θ-direction (clockwise or counterclockwise) motion of the hollow body 102 are controlled so that the extruded bands 504L of the second layer 504 extend in a different direction (e.g., perpendicular) from the direction at which the first extruded bands 502L extend;

(d) moving the print head 104 in the z-direction, e.g., approximately the thickness of second layer 504;

(e) printing third layer 506 by extruding print media material 106 as follows: (i) activating the print nozzle 104N to dispense print media material 106 while the hollow body 102 rotates in the Θ-direction through 0 degrees to 360 degrees to form a first complete band 506L of print media material 106 around the Θ-direction; (ii) once the first complete band 506L is printed, moving the print head 104 in the x-direction less than or equal to one extruded band 506L width (print media material 106 may continue to be dispensed or may be stopped during this x-direction motion); (iii) dispensing print media material 106 while the hollow body 102 rotates in the Θ-direction through 0 degrees to 360 degrees to form an adjacent complete band 506L of print media material 106 around the Θ-direction; and (iv) repeating these steps for each band 506L until the complete third layer 506 is printed;

(f) moving the print head 104 in the z-direction, e.g., approximately the thickness of third layer 506;

(g) printing fourth layer 508 by extruding print media material 106 as follows: (i) activating the print nozzle 104N to dispense print media material 106 while the print head 104 is moved in the x-direction to form a first axial band 508L of print media material 106 from one end of the desired axial length of the printed body 600 for that band 508L to the other end of the desired axial length of the printed body 600 for that band 508L; (ii) once the first axial band 508L is printed, rotating the hollow body 102 in the Θ-direction less than or equal to one extruded band 508L width (print media material 106 may continue to be dispensed or may be stopped during this Θ-direction motion); (iii) dispensing print media material 106 while the print head 104 is moved in the x-direction to form a second axial band 508L of print media material 106 from one end of the desired axial length of the printed body 600 for that band 508L to the other end of the desired axial length of the printed body 600 for that band 508L; and (iv) repeating these steps for each band 508L until the complete fourth layer 508 is printed;

(h) print any additional desired printed layers or partial printed layers (with the extruded bands and/or fiber reinforcing material oriented in any desired direction (s)); and (i) removing the printed body 600 from the hollow print support body 102 (if necessary or desired).

In this manner, as shown in FIG. 10, adjacent layers of the printed body 600 include layers of extruded bands of print media material 106 oriented in multiple different directions through the printed body 600. Optionally, as shown in FIG. 10, the bands 502L of the first layer 502 are oriented perpendicular to the bands 504L of the adjacent second layer 504; the bands 506L of the third layer 506 are oriented perpendicular to the bands 508L of the fourth layer 508; and none of the bands 502L-508L of layers 502-508 are oriented parallel to one another.

The control system 200 may receive data to drive print system 1000, 2000, and/or 3000 in any desired form or format without departing from this technology. In some more specific examples, such driver data may include instructions to control: (a) relative motion of the print head 104 with respect to the surface S on which print media material 106 is to be deposited in the x-direction (e.g., motion of the print head 104 along guide rail 120), (b) relative motion of the print head 104 with respect to the surface S on which print media material 106 is to be deposited in the Θ-direction (e.g., rotation of the hollow body 102 on rotation supports 110B), (c) relative motion of the print head 104 with respect to the surface S on which print media material 106 is to be deposited in the z-direction (e.g., motion of the guide rail 120 on guide rail supports 130A, 130B), and (d) dispensing of print media material 106, e.g., during any one or more of those types of relative motion (e.g., controlling the extruder to dispense print media material 106 through nozzle 104N). This selective control by control system 200 may be used to create a printed body 600 in a desired shape, with the desired number of layers, etc.

In at least some examples of this technology, data supplied to and/or used by the control system 200 may use cylindrical coordinates rather than Cartesian coordinates. As some more specific examples, data supplied to and/or used by the control system 200 may include instructions to: (a) move print head 104 along guide rail 120 in the x-direction (the axial direction) from a first point (e.g., near one end 102A) to second point (e.g., near the other end 102B) and dispense print media material 106 during all, one or more, or no portions of this print head 104 motion; (b) rotate hollow body 102 on rotary supports 110B from a start Θ-position to a finish Θ-position and/or through a predetermined number of rotational degrees and dispense print media material 106 during all, one or more, or no portions of this rotary motion; and (c) move guide rail 120 along guide rail supports 130A, 130B in the z-direction from a first point to a second point (the radial direction) and dispense print media material 106 during all, one or more, or no portions of this guide rail 120 motion.

As some more specific examples, the data may take the form of plural two-dimensional bitmaps, e.g., with each individual bitmap corresponding to a layer 502-508 of the desired design (the z-direction). The bitmaps include data (bits) to indicate whether print media material 106 should be deposited at a specific location of the layer represented in the bitmap. For each bitmap layer, one dimension of the bitmap may correspond to an x-direction of that individual layer, and the other dimension of that bitmap may correspond to the Θ position of the layer. Individual bits within the bitmap may be coded as: (a) "0" at two-dimensional locations of the z-dimensional layer at which the print nozzle 104N should not dispense print media material 106, and (b) "1" at two-dimensional locations of the z-dimensional layer at which the print nozzle 104N should dispense print media material 106. When the data for one bitmap/layer has been used to form a layer, the next adjacent (and interior) bitmap for the next layer may be used to form the next layer. Additional data may be provided, for example, to indicate whether the print nozzle should dispense print media material 106 during motion of the guide rail 120 and print head 104 in the z-direction and/or as the print head 104 moves from forming one extruded band to the next band within a layer. As another option, printing systems 1000, 2000, and/or 3000 in accordance with at least some examples of this technology could be configured and/or programmed to not dispense print media material 106 during motion in the z-direction. The individual bitmaps and/or other data associated with a layer may include data to indicate the manner in which the print head moving systems should be activated in a given layer and/or the relative movement speeds to be used in printing that layer to lay down the extruded lines in the desired direction(s). Additionally or alternatively, other data structures may be used to drive and control the printing system(s) 1000, 2000, and/or 3000 in whole or in any part and/or the data structure described above could be compressed.

Figure 11:
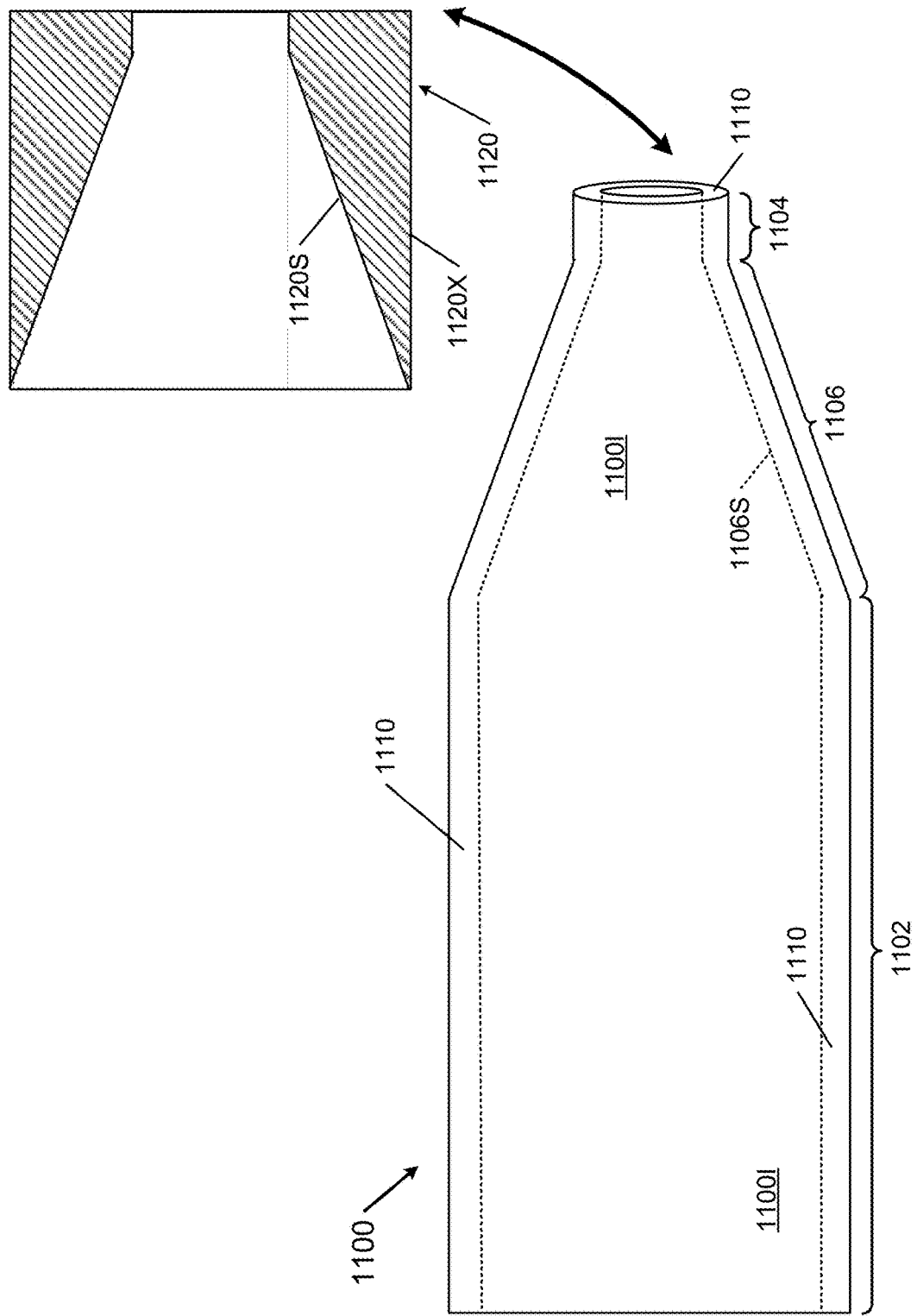

As described above, aspects of this technology may be used to print cylindrical hollow bodies, e.g., having circular outer circumferences of constant diameter. See FIG. 5E. Other options are possible. As noted above, aspects of this technology may be used to form cylindrical structures with hollow interiors useful for rocket bodies, fuselages (e.g., for aircraft, for underwater vehicles, for submersibles, etc.), missile bodies, torpedo bodies, etc. FIGS. 11, 12, and 13 illustrate examples of some additional hollow printed body structures 1100, 1200, and 1300 that may be formed using systems and methods in accordance with at least some examples of this technology (on the inside of a hollow body 102).

FIG. 11 shows a hollow printed body 1100, e.g., having a multi-layer printed structure 1110 and a hollow interior 1100I of the types described above. This printed body 1100, however, includes a first portion 1102 of a first diameter/size (e.g., a first end portion as a cylinder), a second portion 1104 of a second diameter/size (e.g., a second end portion as a cylinder), and a "transition region" 1106 located between and connecting the first portion 1102 and the second portion 1104 (and varying in size/diameter).

The transition region 1106 of printed body 1100 may be created during the printing process—in the interior 102I of hollow body 102—in any appropriate manner without departing from this technology. For example, if desired, the transition region surface 1106S may be printed, as multiple layers, by dispensing print media material 106 while the print head 104 is moved in the z-direction (by moving guide rail 120 in the z-direction along supports 130A, 130B) and while the print head 104 also is moved in the x-direction (along guide rail 120) and/or while the hollow body 102 is rotated in the Θ-direction. If necessary or desired, the interior 102I of the hollow body 102 may be fitted with an adapter 1120 or other structure to provide support for printing the various layers when forming transition region 1106 and the second region 1104. More specifically, the exterior surface 1120X of adapter 1120 may be engaged with the interior surface 102I of the hollow body 102 at the desired location for the transition region 1106. The adapter 1120 may be attached to the hollow body 102 interior in any desired manner (e.g., by mechanical connectors, by adhesives, by welding or other fusing techniques, etc.). The interior surface 1120S of this adapter 1120 may be sized and shaped to correspond to the desired size and shape of the exterior surface of the printed body 1100, including the transition region 1106 and second portion 1104. Additionally or alternatively, if desired, the interior surface 102I of the hollow body 102 may be formed to include surfaces corresponding to the interior surface 1120 of the desired exterior shape of the printed structure 1100. The print head 104 may be controlled, e.g., by control system 200, to dispense print media material 106 on the desired interior surface 102I and other surfaces S, regardless of its/their shape(s).

FIG. 12 illustrates another example shape for a printed body 1200 that may be created in accordance with some examples of this technology. In this example, the printed body 1200 (100% printed) has a frusto-conical shape having open ends 1202A, 1202B. The hollow printed body 1200 (e.g., having a multi-layer printed structure 1210 and a hollow interior 1200I of the types described above) includes a first portion 1202 of a first and constant diameter/size (e.g., a first end portion as a cylinder) and a tapered portion 1204 extending to open end 1202B of another desired diameter/size. If desired, an end cap 1240 made of any desired material (including a printed structure made from a 3D printed material) may be engaged with one end (e.g., open end 1202B, in this example) to close off the overall conical structure 1250. Reference number 1250 represents the combined structure of printed body 1200 and end cap 1240. Any desired manner of engaging end cap(s) 1240 with printed body structures 1200 may be used in accordance with this technology, such as adhesives, mechanical connectors, welding or other fusing techniques, etc. Such end caps 1240, of any desired size and/or shape, may be provided on either or both ends of structure 1250. This type of frusto-conical printed body 1200 may be formed in a hollow body 102 including an adapter having a desired internal shape, e.g., of the types described above in conjunction with FIG. 11 and/or within a hollow body 102 having an integrally formed interior surface 102I having the desired exterior surface 1200X shape of printed body 1200.

FIG. 13 illustrates another example shape for a printed body 1300 that may be created in accordance with some examples of this technology. In this example, the printed body 1300 (100% printed) has a frusto-ogive shape having open ends 1302A, 1302B. The hollow printed body 1300 (e.g., having a multi-layer printed structure 1310 and a hollow interior 1300I of the types described above) includes a first portion 1302 of a first and constant diameter/size (e.g., a first end portion as a cylinder) and an inwardly arched portion 1304 extending to open end 1302B. If desired, an end cap 1340 made of any desired material (including a printed structure made from a 3D printed material) may be engaged with one end (e.g., open end 1302B, in this example) to close off the end and provide the overall ogive structure 1350. Reference number 1350 represents the combined structure of printed body 1300 and end cap 1340. Any desired manner of engaging end cap(s) 1340 with printed body structures 1300 may be used in accordance with this technology, such as adhesives, mechanical connectors, welding or other fusing techniques, etc. Such end caps 1340, of any desired size and/or shape, may be provided on either or both ends of structure 1350. This type of frusto-ogive printed body 1300 may be formed in a hollow body 102 including an adapter having a desired internal shape, e.g., of the types described above in conjunction with FIG. 11 and/or within a hollow body 102 having an integrally formed interior surface 102I having the desired exterior surface 1300X shape of printed body 1300.

Figure 14B:
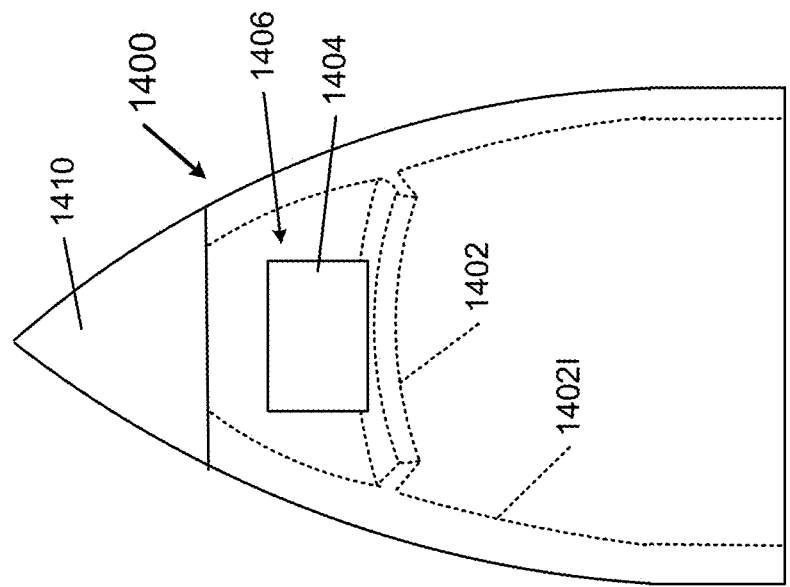
FIGS. 14A and 14B illustrate hollow structures in accordance with some examples of this technology equipped with printed internal support structures and loaded with payload supported by the support structures.
Figure 14A:
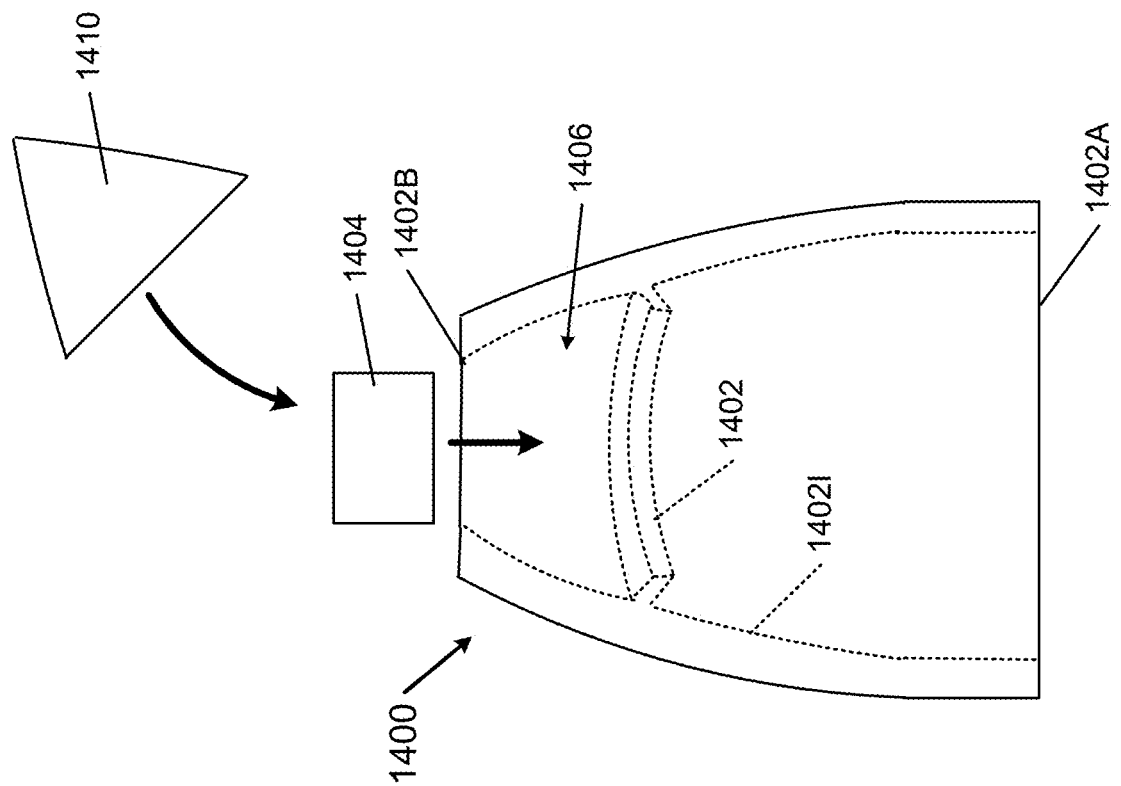

FIGS. 14A and 14B illustrate other example features and aspects of this technology. In this illustrated example, a hollow printed body 1400 is printed to include a printed support structure 1402 integrally formed as part of its interior surface 1402I. While a frusto-ogive body like that of FIG. 13 is shown in the example of FIGS. 14A and 14B, any printed body of any desired size and/or shape may include these types of additional features (e.g., as described above in conjunction with FIG. 6). The support structure 1402 of this example defines a base or flange for supporting a load 1404 within a chamber 1406 defined within the interior of printed body 1400. The load 1404 may be anything desired to be housed within chamber 1406, such as a sensor, a sensor package, a payload, etc. Once load 1404 is placed in chamber 1406, e.g., through an open end 1402B (or open end 1402A) the open end 1402B (and, if desired, both ends 1402A, 1402B) of the printed body 1400 may be closed off, e.g., by an end cap 1410 (e.g., as described above in conjunction with FIGS. 12 and 13).

The hollow body 102 used as the print support base may be of any desired size without departing from this technology. As some examples, the interior diameter of hollow body 102 may be within a range of 100 mm to 6 m, or even larger. As some additional examples, the interior diameter of hollow body 102 may be in the range of 150 mm to 5 m, 200 mm to 4 m, 250 mm to 3 m, or even 275 mm to 2.5 m. Similarly, the printed body (e.g., 600, 1100, 1200, 1300, and/or 1400) may have an exterior diameter within any of the ranges above (as the exterior surface of the printed body is formed on the interior surface 102I of the hollow body 102). The printed layers (e.g., 502-508) may combine to form any desired thickness (e.g., transverse to the axial direction, in the z-direction), including the following ranges: 0.25 mm to 1 m; 0.5 mm to 750 mm; 0.75 mm to 500 mm; 1 mm to 400 mm; 2 mm to 300 mm; 5 mm to 250 mm; etc.

Aspects of this technology may be particularly useful in forming thin-walled hollow (e.g., cylindrical) structures, including thin-walled structures of relatively large diameter or size. In at least some examples of this invention, a ratio $V_{INT}/V_{EXT}$ of the volume of the interior chamber 600I defined by the hollow printed body (e.g., "$V_{INT}$") to the volume defined by the exterior surface of the hollow printed body (e.g., "$V_{EXT}$") may be within the range of 0.25 to 0.98, and in some examples, within the ranges of one or more of: 0.3 to 0.95; 0.4 to 0.92; 0.5 to 0.90; and 0.6 to 0.88.

Aspects of this technology can reduce manufacturing timelines for such hollow end products, lower costs, reduce waste, lower weight, facilitate easier design modifications, and/or allow better or more integrated incorporation of sensors and electronics. Additionally or alternatively, aspects of this technology enable production of a variety of different parts having a common exterior body size (also called "outer mold line" or "OML" for molded parts) and/or shape but optionally different interior structures. This may enable production of a plurality of printed parts for accommodating different payloads or other internal printed features that all still have a common exterior diameter/size that will fit within a common sized receptacle (e.g., forming several missile bodies having different payloads that all will correctly fit within a chamber of a missile launch tube).

CONCLUSION

For the avoidance of doubt, the present application includes, but is not limited to, the subject-matter described in the following numbered clauses:

1. A method of printing, comprising:
   placing a print head including a print nozzle within an interior of a hollow mandrel;
   positioning the print nozzle at a location adjacent a surface located within the interior of the hollow mandrel;
   dispensing print media material through the print nozzle onto the surface at the location;
   rotating the hollow mandrel about a rotational axis;
   moving the print head in a first direction substantially parallel to the rotational axis, wherein at least one of the steps of rotating the hollow mandrel and moving the print head in the first direction occurs while the print media material is being dispensed; and
   moving the print head in a second direction substantially perpendicular to and away from the surface onto which the print media material is being dispensed.
2. The method of clause 1, wherein the step of moving the print head in the first direction occurs while the print media material is being dispensed.
3. The method of clause 1 or 2, wherein the step of rotating the hollow mandrel occurs while the print media material is being dispensed.
4. The method of clause 1 or 2, wherein the step of rotating the hollow mandrel occurs at a time when print media material is not being dispensed.
5. The method of clause 1 or 3, wherein the step of moving the print head in the first direction occurs while the print media material is not being dispensed.
6. The method of any one of clauses 1 to 5, wherein the step of moving the print head in the second direction occurs at a time when print media material is not being dispensed.
7. The method of any one of clauses 1 to 6, wherein the interior of the hollow mandrel constitutes a cylindrical surface, wherein the rotation axis is a central axis of the cylindrical surface, wherein the first direction is substantially horizontal, and wherein the second direction is substantially vertical.
8. The method of any one of clauses 1 to 7, further comprising:
   separating the hollow mandrel from the print media material deposited on the interior thereof.
9. The method of any one of clauses 1 to 8, wherein the dispensed print media material forms a rocket body.
10. The method of any one of clauses 1 to 9, wherein the dispensed print media material forms a hollow body for a fuselage, a missile, or a torpedo.
11. A method of printing a hollow body, comprising:
    placing a print head including a print nozzle within an interior of a hollow mandrel, the hollow mandrel including an exterior surface and an interior surface opposite the exterior surface, the interior surface defining the interior of the hollow mandrel;

forming a first printed layer of the hollow body, including the steps of:
(a) positioning the print nozzle at a location adjacent the interior surface of the hollow mandrel;
(b) dispensing print media material through the print nozzle onto the interior surface at the location;
(c) moving the print head along the interior surface; and
(d) rotating the hollow mandrel, wherein at least one of the steps of moving the print head and rotating the hollow mandrel occurs while print media material is being dispensed onto the interior surface,
wherein the step of forming the first printed layer forms an exterior surface of the hollow body positioned in contact with the interior surface of the hollow mandrel, wherein the first printed layer includes an interior surface, and wherein the first printed layer extends continuously around 360 degrees of the interior surface of the hollow mandrel;
moving the print head in a direction away from a print media material deposit location at the interior surface of the first printed layer;
forming a second printed layer of the hollow body, including the steps of:
(a) positioning the print nozzle at a location adjacent the interior surface of the first printed layer;
(b) dispensing print media material through the print nozzle onto the interior surface of the first printed layer at the location adjacent the interior surface of the first printed layer;
(c) moving the print head in a direction along the interior surface of the first printed layer; and
(d) rotating the hollow mandrel, wherein, when forming the second printed layer, at least one of these steps of moving the print head and rotating the hollow mandrel occurs while the print media material is being dispensed onto the interior surface of the first printed layer,
wherein the step of forming the second printed layer forms the second printed layer in contact with the interior surface of the first printed layer, wherein the second printed layer includes an interior surface, and wherein the second printed layer extends continuously around 360 degrees of the interior surface of the first printed layer.

12. The method of clause 11, further comprising:
printing one or more additional printed layers inside of the second printed layer, wherein the step of printing each additional layer includes:
(a) moving the print head in a direction along an interior-most surface of an immediately preceding printed layer; and
(b) dispensing print media material through the print nozzle onto the interiormost surface of the immediately preceding printed layer while the print head is moving and/or the hollow mandrel is rotating to form a new layer inside of the immediately preceding printed layer.

13. The method of clause 12, wherein the step of printing the one or more additional printed layers prints at least 5 additional printed layers inside the second printed layer.

14. The method of any one of clauses 11 to 13, wherein at least one of the steps of rotating the hollow mandrel occurs while the print media material is being dispensed.

15. The method of any one of clauses 11 to 14, wherein at least one of the steps of moving the print head occurs while the print media material is being dispensed.

16. The method of any one of clauses 11 to 15, wherein at least one of the steps of rotating the hollow mandrel occurs at a time when print media material is not being dispensed.

17. The method of any one of clauses 11 to 16, wherein at least one of the steps of moving the print head occurs at a time when print media material is not being dispensed.

18. The method of any one of clauses 11 to 17, wherein the interior of the hollow mandrel constitutes a cylindrical surface, wherein the steps of rotating the hollow mandrel rotate the hollow mandrel along a central axis of the cylindrical surface, and wherein the steps of moving the print head in the direction along the interior or interiormost surface includes moving the print head in a direction parallel to the central axis.

19. The method of any one of clauses 11 to 18, further comprising:
separating the hollow mandrel from the first printed layer, wherein the first printed layer, the second printed layer, and any other present printed layers form a printed hollow body.

20. The method of any one of clauses 11 to 19, wherein the printed hollow body is a rocket body.

21. The method of any one of clauses 11 to 19, wherein the printed hollow body is a hollow body for a fuselage, a missile, or a torpedo.

22. A printed structure, comprising:
a first printed layer forming an exterior surface and a first interior surface opposite the exterior surface, wherein the first printed layer includes a first plurality of extruded lines of print material that together form a first enclosed hollow portion that extends continuously for 360 degrees around and thereby defines the first interior surface;
a second printed layer printed onto and at least partially covering the first interior surface, wherein the second printed layer includes a second plurality of extruded lines of print material that together form a second enclosed hollow portion at least partially located in the first enclosed hollow portion, wherein the second enclosed hollow portion extends continuously for 360 degrees to completely cover at least a portion of the first interior surface within the first enclosed hollow portion, and wherein the second printed layer forms a second interior surface; and
a third printed layer printed onto and at least partially covering the second interior surface, wherein the third printed layer includes a third plurality of extruded lines of print material that together form a third enclosed hollow portion at least partially located in the second enclosed hollow portion, wherein the third enclosed hollow portion extends continuously for 360 degrees to completely cover at least a portion of the second interior surface within the second enclosed hollow portion, and wherein the third printed layer forms a third interior surface.

23. The printed structure of clause 22, wherein the first plurality of extruded lines of print material includes a fiber reinforced print media material oriented in a first direction, the second plurality of extruded lines of print material includes the fiber reinforced print material oriented in a second direction different from the first direction, and the third plurality of extruded lines of print material includes the fiber reinforced print material oriented in a third direction different from the first direction and the second direction.

24. The printed structure of clause 22, wherein the first plurality of extruded lines of print material includes a fiber reinforced print media material oriented in a first direction, the second plurality of extruded lines of print material includes the fiber reinforced print material oriented in a second direction different from the first direction, and the third plurality of extruded lines of print material includes the fiber reinforced print material oriented in the first direction.

25. The printed structure of any one of clauses 22 to 24, wherein the printed structure includes: (a) a first section having a first outer diameter, (b) a second section having a second outer diameter that is smaller than the first outer diameter, and (c) a tapered transition section extending between the first section and the second section.

26. The printed structure of any one of clauses 22 to 24, wherein a first end of the printed structure includes a frusto-conical structure.

27. The printed structure of any one of clauses 22 to 24, wherein a first end of the printed structure includes a frusto-ogive structure.

28. The printed structure of any one of clauses 22 to 27, further comprising: a plurality of additional printed layers subsequently formed inside the third interior surface.

29. The printed structure of clause 28, wherein an exposed interior of the printed structure includes a printed support component integrally formed as a unitary, one-piece construction with the printed layers of the printed structure.

30. The printed structure of clause 28, wherein an exposed interior of the printed structure includes a 100% printed surface that is not completely cylindrical.

31. The printed structure of any one of clauses 22 to 30, wherein the printed structure is a 100% printed hollow body having an open first end and an open second end, and wherein the exterior surface of the first printed layer forms an exterior surface of the 100% printed hollow body and extends between the open first end and the open second end.

32. The printed structure of any one of clauses 22 to 30, wherein the printed structure is a 100% printed hollow body, and wherein the exterior surface of the first printed layer forms an exterior surface of the 100% printed hollow body and constitutes a cylindrical surface.

33. The printed structure of any one of clauses 22 to 32, wherein the printed hollow body is a rocket body.

34. The printed structure of any one of clauses 22 to 32, wherein the printed hollow body is a body for a fuselage, a missile, or a torpedo.

35. A printing system, comprising:
a rotatable print support base including a hollow body having an exterior surface and an interior surface, the hollow body defining an interior and being rotatable about a rotational axis;
a guide rail;
a guide rail support configured to support the guide rail such that the guide rail extends at least partially through the interior of the hollow body, wherein the guide rail support is configured to move the guide rail within the interior of the hollow body in a direction away from a region of the interior surface where print media material is deposited; and
a print head mounted on the guide rail and movable in a direction along the guide rail, wherein the print head includes a print nozzle oriented to dispense print media material onto a surface located within the interior of the hollow body.

36. The printing system of clause 35, further comprising:
a support system for rotatably supporting the rotatable print support base.

37. The printing system of clause 35 or 36, further comprising:
a print head moving system for moving the print head in the direction along the guide rail.

38. The printing system of any one of clauses 35 to 37, wherein the guide rail support includes at least one guide rail support member positioned outside of the hollow body.

39. The printing system of any one of clauses 35 to 37, wherein the guide rail support includes a first guide rail support member positioned outside of the hollow body at a first end of the rotatable print support base and a second guide rail support member positioned outside of the hollow body at a second end of the rotatable print support base located opposite the first end.

40. The printing system of any one of clauses 35 to 39, further comprising:
a control system configured to move the print head along the guide rail while print media material is dispensed from the print nozzle.

41. The printing system of any one of clauses 35 to 39, further comprising:
a control system configured to move the guide rail while print media material is dispensed from the print nozzle.

42. The printing system of any one of clauses 35 to 39, further comprising:
a control system configured to move the print head along the guide rail and move the guide rail simultaneously while print media material is dispensed from the print nozzle.

43. The printing system of any one of clauses 35 to 39, further comprising:
a control system configured to rotate the rotatable print support base about the rotational axis while print media material is dispensed from the print nozzle.

44. The printing system according to any one of clauses 35 to 39, further comprising:
a control system configured to selectively control one or more of: (a) rotation of the rotatable print support base about the rotational axis, (b) movement of the print head along the guide rail, and/or (c) movement of the guide rail.

45. The printing system according to clause 44, wherein the control system further controls the print head to selectively dispense print media material through the print nozzle during any one or more of: (a) rotating the rotatable print support base about the rotational axis, (b) moving the print head along the guide rail, and/or (c) moving the guide rail.

46. A system for printing on an interior surface located within an interior of a hollow body, comprising:
a print head including a print nozzle oriented to dispense print media material;
a support system for rotatably supporting a hollow body about a rotational axis;
a print head support system for supporting the print head such that the print nozzle is positionable adjacent an interior surface located within the hollow body and at a position to dispense print media material onto the interior surface; and a print head moving system for moving the print head in a first direction parallel to the rotational axis and in a second direction perpendicular to the first direction.

47. The system of clause 46, further comprising:
a mandrel rotatably supported on the support system, wherein the mandrel includes the hollow body.

48. The system of clause 46 or 47, wherein the print head support system includes a guide rail, wherein the print head is movably mounted with respect to the guide rail to move along the guide rail.

49. The system of clause 48, wherein the print head support system includes a first guide rail support, wherein the guide rail is engaged with the first guide rail support.

50. The system of clause 48, wherein the print head support system includes: (a) a first guide rail support engaging a first side of the guide rail and (b) a second guide rail support engaging a second side of the guide rail.

51. The system of any one of clauses 46 to 50, wherein the print head moving system is configured to move the print head in the first direction while print media material is dispensed from the print nozzle.

52. The system of any one of clauses 46 to 51, wherein the print head moving system is configured to move the print head in the second direction while print media material is dispensed from the print nozzle.

53. The system of any one of clauses 46 to 52, wherein the print head moving system is configured to move the print head in the first direction and in the second direction simultaneously while print media material is dispensed from the print nozzle.

54. The system of any one of clauses 46 to 53, wherein the support system is configured to rotate the hollow body while print medial material is dispensed from the print nozzle.

55. The system according to any one of clauses 46 to 54, further comprising: a control system configured to selectively control one or more of: (a) rotation of the hollow body by the support system, (b) movement of the print head by the print head moving system in the first direction, and/or (c) movement of the print head by the print head moving system in the second direction.

56. The system according to clause 55, wherein the control system further controls the print head to selectively dispense print media material through the print nozzle during any one or more of: (a) rotating the hollow body by the support system, (b) moving the print head by the print head moving system in the first direction, and/or (c) moving the print head by the print head moving system in the second direction.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

What is claimed is:

1. A method of printing, comprising:
placing a print head including a print nozzle within an interior of a hollow mandrel;
positioning the print nozzle at a location adjacent a surface located within the interior of the hollow mandrel;
dispensing print media material through the print nozzle onto the surface at the location;
rotating the hollow mandrel about a rotational axis;
moving the print head in a first direction substantially parallel to the rotational axis, wherein at least one of the steps of rotating the hollow mandrel and moving the print head in the first direction occurs while the print media material is being dispensed; and
moving the print head in a second direction substantially perpendicular to and away from the surface onto which the print media material is being dispensed,
wherein the print media material forms a hollow body for a rocket, a fuselage, a missile, or a torpedo.

2. The method of claim 1, wherein the step of moving the print head in the first direction occurs while the print media material is being dispensed.

3. The method of claim 2, wherein the step of rotating the hollow mandrel occurs while the print media material is being dispensed.

4. The method of claim 1, wherein the step of rotating the hollow mandrel occurs while the print media material is being dispensed.

5. The method of claim 1, wherein the interior of the hollow mandrel constitutes a cylindrical surface, wherein the rotational axis is a central axis of the cylindrical surface, wherein the first direction is substantially horizontal, and wherein the second direction is substantially vertical.

6. The method of claim 1, further comprising:
separating the hollow mandrel from the print media material deposited on the interior thereof.

7. The method of claim 1, wherein the print head is controlled to move and dispense the print media material to form a 100% printed hollow structure having an exterior surface with at least one of a tapered region, a frusto-conical structure, or a frusto-ogive structure.

8. The method of claim 1, wherein the hollow body comprises a hollow body for a rocket.

9. The method of claim 1, wherein the hollow body comprises a hollow body for a fuselage.

10. The method of claim 1, wherein the hollow body comprises a hollow body for a missile.

11. The method of claim 1, wherein the hollow body comprises a hollow body for a torpedo.

12. A method of printing a hollow body, comprising:
placing a print head including a print nozzle within an interior of a hollow mandrel, the hollow mandrel including an exterior surface and an interior surface opposite the exterior surface, the interior surface defining the interior of the hollow mandrel;
forming a first printed layer of the hollow body, including the steps of:
(a) positioning the print nozzle at a location adjacent the interior surface of the hollow mandrel;
(b) dispensing print media material through the print nozzle onto the interior surface at the location;
(c) moving the print head along the interior surface; and
(d) rotating the hollow mandrel, wherein at least one of the steps of moving the print head and rotating the hollow mandrel occurs while print media material is being dispensed onto the interior surface,
wherein the step of forming the first printed layer forms an exterior surface of the hollow body positioned in contact with the interior surface of the hollow mandrel, wherein the first printed layer includes an interior surface, and wherein the first printed layer extends continuously around 360 degrees of the interior surface of the hollow mandrel;

moving the print head in a direction away from a print media material deposit location at the interior surface of the first printed layer;

forming a second printed layer of the hollow body, including the steps of:
  (a) positioning the print nozzle at a location adjacent the interior surface of the first printed layer;
  (b) dispensing print media material through the print nozzle onto the interior surface of the first printed layer at the location adjacent the interior surface of the first printed layer;
  (c) moving the print head in a direction along the interior surface of the first printed layer; and
  (d) rotating the hollow mandrel, wherein, when forming the second printed layer, at least one of these steps of moving the print head and rotating the hollow mandrel occurs while the print media material is being dispensed onto the interior surface of the first printed layer, wherein the step of forming the second printed layer forms the second printed layer in contact with and at least partially covering the interior surface of the first printed layer, wherein the second printed layer includes an interior surface, and wherein the second printed layer extends continuously around 360 degrees of the interior surface of the first printed layer, and wherein the print media material forms the hollow body as a hollow body for a rocket, a fuselage, a missile, or a torpedo.

13. The method of claim 12, further comprising:
printing one or more additional printed layers inside of the second printed layer, wherein the step of printing each additional layer includes:
  (a) moving the print head in a direction along an interiormost surface of an immediately preceding printed layer; and
  (b) dispensing print media material through the print nozzle onto the interiormost surface of the immediately preceding printed layer while the print head is moving and/or the hollow mandrel is rotating to form a new layer inside of and at least partially covering the immediately preceding printed layer.

14. The method of claim 13, wherein the step of printing the one or more additional printed layers prints at least 5 additional printed layers inside the second printed layer.

15. The method of claim 13, wherein the interior of the hollow mandrel constitutes a cylindrical surface, wherein the steps of rotating the hollow mandrel rotate the hollow mandrel along a central axis of the cylindrical surface, and wherein the steps of moving the print head in the direction along the interior or interiormost surface includes moving the print head in a direction parallel to the central axis.

16. The method of claim 12, wherein at least one of the steps of rotating the hollow mandrel occurs while the print media material is being dispensed.

17. The method of claim 12, wherein at least one of the steps of moving the print head occurs while the print media material is being dispensed.

18. The method of claim 12, wherein at least one of the steps of rotating the hollow mandrel occurs at a time when print media material is not being dispensed.

19. The method of claim 12, wherein at least one of the steps of moving the print head occurs at a time when print media material is not being dispensed.

20. The method of claim 12, further comprising:
separating the hollow mandrel from the first printed layer, wherein the first printed layer, the second printed layer, and any other present printed layers form a printed hollow body.

21. The method of claim 12, wherein the exterior surface of the hollow body includes at least one of a tapered region, a frusto-conical structure, or a frusto-ogive structure.

22. The method of claim 12, wherein the hollow body is a 100% printed hollow body.

23. The method of claim 12, wherein the hollow body comprises a hollow body for a rocket.

24. The method of claim 12, wherein the hollow body comprises a hollow body for a fuselage.

25. The method of claim 12, wherein the hollow body comprises a hollow body for a missile.

26. The method of claim 12, wherein the hollow body comprises a hollow body for a torpedo.

27. A printing system, comprising:
a rotatable print support base including a hollow mandrel having an exterior surface and an interior surface, the hollow mandrel defining an interior and being rotatable about a rotational axis, wherein the interior surface of the hollow mandrel is configured to receive a deposit of print media material to form a hollow body for a rocket, a fuselage, a missile, or a torpedo;

a guide rail;

a guide rail support configured to support the guide rail such that the guide rail extends at least partially through the interior of the hollow mandrel, wherein the guide rail support is configured to move the guide rail within the interior of the hollow mandrel in a direction away from a region of the interior surface where print media material is deposited;

a print head mounted on the guide rail and movable in a direction along the guide rail, wherein the print head includes a print nozzle oriented to dispense print media material onto a surface located within the interior of the hollow mandrel; and a control system configured to control the printing system to deposit the print media material to form the hollow body.

* * * * *